(12) United States Patent
Briançon et al.

(10) Patent No.: US 10,642,300 B1
(45) Date of Patent: *May 5, 2020

(54) MONITORING OF ELECTRICAL APPLIANCES BASED ON DISPERSION OF IMPEDANCE

(71) Applicant: Alarm.com Incorporated, Tysons, VA (US)

(72) Inventors: Alain Charles Briançon, Poolesville, MD (US); Robert Leon Lutes, Lawrence, KS (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,263

(22) Filed: Aug. 12, 2019

Related U.S. Application Data

(63) Continuation of application No. 14/871,632, filed on Sep. 30, 2015, now Pat. No. 10,379,559.

(51) Int. Cl.
*G01F 1/66* (2006.01)
*G05F 1/66* (2006.01)
*G05B 15/02* (2006.01)

(52) U.S. Cl.
CPC ............... *G05F 1/66* (2013.01); *G05B 15/02* (2013.01)

(58) Field of Classification Search
CPC .................... G05F 1/66; G05B 15/02
See application file for complete search history.

(56) References Cited

U.S. PATENT DOCUMENTS

| | | | |
|---|---|---|---|
| 8,683,236 B2 * | 3/2014 | Ukita | G06F 21/33 |
| | | | 700/286 |
| 2011/0185197 A1 | 7/2011 | Ukita | |
| 2013/0201018 A1 | 8/2013 | Horstenneyer | |
| 2014/0054963 A1 | 2/2014 | Spitchka | |
| 2014/0333322 A1 | 11/2014 | Kabler | |
| 2014/0333323 A1 | 11/2014 | Kabler et al. | |

(Continued)

OTHER PUBLICATIONS

Pashdar, Real-Time Health Monitoring of Power Networks Based on High Frequency Behavior (2014) (https://etd.ohiolink.edu/pg 10?::NO:10:P10 ETD SU BI D:99670).

(Continued)

*Primary Examiner* — Peter Bradford
(74) *Attorney, Agent, or Firm* — Fish & Richardson P.C.

(57) ABSTRACT

Systems and techniques enable monitoring one or more devices connected to an electrical power distribution system. In some implementations, a probe waveform is injected into a circuit of an electrical power distribution system. An output signal of the injected probe waveform is extracted from the circuit of the electrical power distribution system and, based on the extracted output signal of the injected probe waveform, dispersion values for the branch circuit are determined. The dispersion values indicate a variation of magnitude of an impedance of the branch circuit across different values of phase of the impedance. Based on the dispersion values for the branch circuit, at least one characteristic of a device connected to the branch circuit is determined. An association between the at least one characteristic of the device connected to the branch circuit and the corresponding dispersion values is stored in at least one computer memory.

20 Claims, 16 Drawing Sheets

(56) References Cited

U.S. PATENT DOCUMENTS

| | | |
|---|---|---|
| 2014/0333324 A1 | 11/2014 | Kabler et al. |
| 2015/0198938 A1 | 7/2015 | Steele |
| 2015/0378383 A1 | 12/2015 | Hsu |
| 2017/0052222 A1 | 2/2017 | Pasdar |
| 2017/0191695 A1* | 7/2017 | Bruhn .................... G05B 15/02 |

OTHER PUBLICATIONS

Gulati et al., "An In Depth Study into Using EMI Signatures for Appliance", arXiv:1409.4438v1 [cs.SY] (Sep. 15, 2014).

Agyennan et al., "Real-Time Recognition Non-Intrusive Electrical Appliance Monitoring Algorithm for a Residential Building Energy Management System", Energies 2015, 8, 9029-9048 (2015).

Pasdar et al., "Power-Line Impedance Estimation at FCC Band Based on Intelligent Home Appliances Status Detection Algorithm Through Their Individual Energy and Impedance Signatures", IEEE Transactions on Power Delivery • Jun. 2014 DOI: 10.1109/TPWRD.2013.2286154 (2014).

Ruzzelli et al., "Real-Time Recognition and Profiling of Appliances through a Single Electricity Sensor", DOI: 10.1109/SECON .2010.5508244 • Source: IEEE Xplore (2010).

Abeykoon, "Real Time Identification of Electrical Devices through Power Consumption Pattern Detection", DOI: 10.1109/MNTMSirn.2016.13 (2016).

13. Huang et al., "Signature-based Detection for Activities of Appliances", PES, 2015.

\* cited by examiner

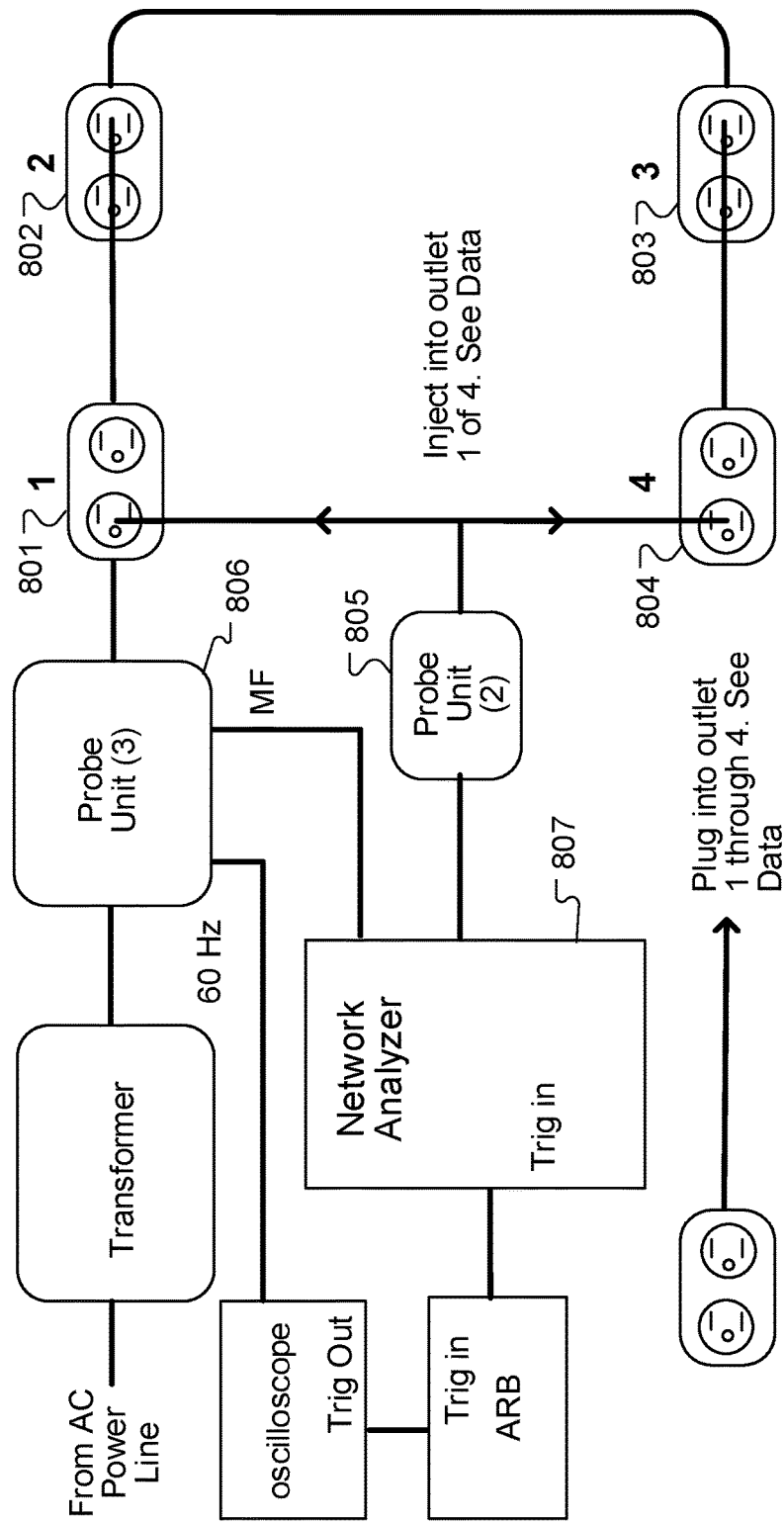

FIG. 8

Circuit
1. Load devices connect to outlets 1 through 4. See data.
2. Probe Unit (2) – a tool that couples signals onto the power line to allow measurement of line and load characteristics.
3. Probe Unit (3) – tool that allows signals on the power line to be extracted in bands for evaluation of line noise characteristics.
4. Data taken using high frequency Probe Unit (2) and MF Probe Unit (3).
5. Data also taken with low frequency Probe Unit (2) and LF port of Probe Unit (3).

| Pulse burst transmission within pulse trains | Number of transitions in a pulse burst | Frequency of pulse burst (MHz) | Duration of each transition in a pulse burst (msec) | Duration of a pulse burst (msec) | Duration of gap following a pulse burst (msec) |
|---|---|---|---|---|---|
| 1 | 200 | 50 | 0.02 | 4 | 5 |
| 2 | 200 | 33.33 | 0.03 | 6 | 5 |
| 3 | 200 | 25 | 0.04 | 8 | 5 |
| 4 | 200 | 20 | 0.05 | 10 | 5 |
| 5 | 200 | 12.5 | 0.08 | 16 | 5 |
| 6 | 200 | 10 | 0.1 | 20 | 5 |
| 7 | 200 | 6.25 | 0.16 | 32 | 5 |
| 8 | 200 | 5 | 0.2 | 40 | 5 |
| 9 | 200 | 3.125 | 0.32 | 64 | 5 |
| 10 | 200 | 2.5 | 0.4 | 80 | 5 |
| 11 | 200 | 2 | 0.5 | 100 | 5 |
| 12 | 200 | 1.15 | 0.8 | 120 | 5 |

Pulse train duration (msec) = 600

FIG. 10

MONITORING OF ELECTRICAL APPLIANCES BASED ON DISPERSION OF IMPEDANCE

CROSS-REFERENCE TO RELATED APPLICATIONS

This application is a continuation of U.S. application Ser. No. 14/871,632, filed Sep. 30, 2015, which is incorporated by reference in its entirety.

TECHNICAL FIELD

The present disclosure relates to monitoring electronic appliances connected to a power distribution network in homes or businesses.

BACKGROUND

Most homes and businesses, both within the United States and around the world, use electrical power to operate a wide variety of appliances. For example, in a typical home or business, electrical appliances may consume electrical power to operate motors, provide lighting, operate entertainment electronics, operate computing electronics, provide heating and/or cooling for a building, for use in food preparation, cleanup, and/or food storage, to heat water, and for various power conversion processes required to operate an appliance.

SUMMARY

Techniques are described that provide systems and/or methods for monitoring electrical devices that receive electrical power through an existing electrical system. Such techniques may enable the identification of devices, their relative positions and operational status on electrical circuits in industrial and home environments.

In one aspect, a computer-implemented method includes injecting a probe waveform into a circuit of an electrical power distribution system; extracting an output signal of the injected probe waveform from the circuit of the electrical power distribution system; determining, based on the extracted output signal of the injected probe waveform, dispersion values for the branch circuit, the dispersion values indicating a variation of magnitude of an impedance of the branch circuit across different values of phase of the impedance; determining, based on the dispersion values for the branch circuit, at least one characteristic of a device connected to the branch circuit; and storing, in at least one computer memory, an association between the at least one characteristic of the device connected to the branch circuit and the corresponding dispersion values.

Implementations may include one or more of the following features. In some implementations, the circuit includes at least one of a branch circuit, a feeder circuit, a shared-neutral circuit, or a multiwire circuit.

In some implementations, determining, based on the dispersion values for the circuit, at least one characteristic of a device connected to the circuit includes determining at least one of an identity of a device connected to the circuit, an operational status of a device connected to the circuit, a range of physical locations of a device connected to the circuit, or a co-location of a device connected to the circuit.

In some implementations, determining an identity of a device connected to the circuit includes: accessing, from the at least one computer memory, stored first dispersion values that are associated with a first device; accessing, from the at least one computer memory, stored second dispersion values that are associated with a second device; comparing the dispersion values for the circuit with the stored first dispersion values and the stored second dispersion values; and determining, based on comparing the dispersion values for the circuit with the stored first dispersion values and the stored second dispersion values, whether the first device or the second device is connected to the circuit.

In some implementations, determining an operational status of a device connected to the circuit includes accessing, from the at least one computer memory, stored first dispersion values that are associated with a first operation status of the device; accessing, from the at least one computer memory, stored second dispersion values that are associated with a second operational status of the device; comparing the dispersion values for the circuit with the stored first dispersion values and the stored second dispersion values; and determining, based on comparing the dispersion values for the circuit with the stored first dispersion values and the stored second dispersion values, whether the device is in the first operational status or the second operational status.

In some implementations, determining a range of physical locations of a device connected to the circuit includes accessing, from the at least one computer memory, stored first dispersion values that are associated with a first range of locations of the device; accessing, from the at least one computer memory, stored second dispersion values that are associated with a second range of locations of the device; comparing the dispersion values for the circuit with the stored first dispersion values and the stored second dispersion values; and determining, based on comparing the dispersion values for the circuit with the stored first dispersion values and the stored second dispersion values, whether the device is at the first range of locations or the second range of locations.

In some implementations, comparing the dispersion values for the circuit with the stored first dispersion values and the stored second dispersion values includes comparing a rate of change of dispersion values as a function of frequency for the circuit with a first rate of change of stored first dispersion values as a function of frequency and a second rate of change of stored second dispersion values as a function of frequency.

In some implementations, injecting a probe waveform into a circuit of an electrical power distribution system includes injecting a first probe waveform at a first time delay after a first zero-crossing of a power line voltage signal of the circuit, and injecting a second probe waveform at a second time delay after a second zero-crossing of the power line voltage signal of the circuit. Extracting an output signal of the injected probe waveform from the circuit of the electrical power distribution system includes extracting the first probe waveform from the circuit, and extracting the second probe waveform from the circuit.

In some implementations, determining, based on the extracted output signal of the injected probe waveform, dispersion values for the circuit includes determining a variation between a first magnitude of the impedance of the circuit at a first phase corresponding to the first time delay after the first zero-crossing of the power line voltage signal and a second magnitude of the impedance of the circuit at a second phase corresponding to the second time delay after the second zero-crossing of the power line voltage signal; and determining the dispersion values for the circuit based on the variation between the first magnitude of the impedance at the first phase and the second magnitude of the impedance at the second phase.

In some implementations, the method further includes accessing, from the at least one computer memory, baseline dispersion values, and subtracting, from the dispersion values of the circuit, the baseline dispersion values.

In some implementations, the circuit is one of a first branch circuit or a second branch circuit, the first branch circuit operating at a first phase of the electrical power distribution system, and the second branch circuit operating at a second phase of the electrical power distribution system. The method further includes injecting a first probe waveform into the first branch circuit, and injecting a second probe waveform into the second branch circuit. A first output signal of the injected first probe waveform is extracted from the first branch circuit of the electrical power distribution system; and a second output signal of the injected second probe waveform is extracted from the second branch circuit of the electrical power distribution system.

In some implementations, the circuit is one of a first branch circuit or a second branch circuit, the first branch circuit operating at a first phase of the electrical power distribution system, and the second branch circuit operating at a second phase of the electrical power distribution system. The method further includes injecting a first probe waveform into the first branch circuit, and injecting a second probe waveform into the second branch circuit. A second output signal of the injected second probe waveform is extracted from the first branch circuit of the electrical power distribution system; and a first output signal of the injected first probe waveform is extracted from the second branch circuit of the electrical power distribution systems.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims.

BRIEF DESCRIPTION OF THE DRAWINGS

FIG. 8 is a diagram of an example of a configuration for measuring impedance relative to the power line voltage phase;

FIG. 10 is a table illustrating examples of characteristics of a probe waveform that may be used for probing;

DETAILED DESCRIPTION

Figure 1:
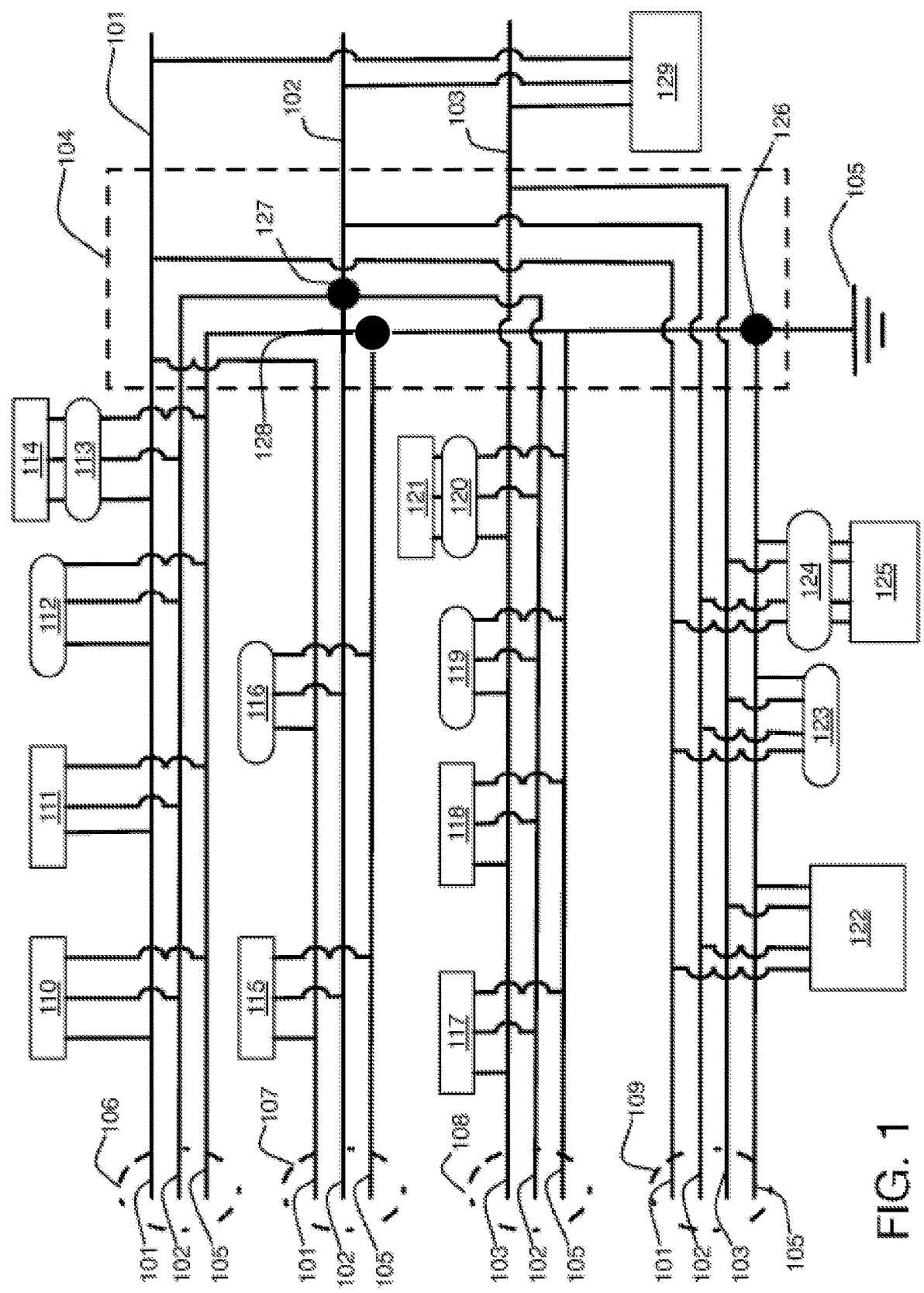
FIG. 1 is a diagram of an example of an electrical power distribution system with appliances and probe units.

Techniques are described for monitoring devices that are connected to an electrical power distribution network. In some implementations, a system monitors, detects, classifies and identifies a range of locations, co-locations, and/or operational status of devices connected to an electrical power distribution system, whether inside a home or business, or in an external environment.

The system may perform this monitoring by using one or more probes to measure electrical signals on an electrical power distribution system through which the devices receive power, and analyzing those electrical signals. In particular, the system may analyze the variations of impedance with respect to phase across one or more cycles of voltage in the electrical power distribution signals for fixed loads. The variation of impedance with respect to phase is generally referred to herein as "electrical dispersion" or simply "dispersion." For a given load that is connected to the electrical system, the dispersion quantifies the degree to which the impedance of the load changes as a function of the phase of the impedance.

In some implementations, the system may analyze the electrical dispersion at different frequency points and determine how the dispersion changes across frequencies. By analyzing this dispersion across frequencies, the system may determine the load corresponding to a device, and various characteristics of the device, such as an operational status of the device and/or a location of the device relative to the probe and relative to other devices in the system. As such, the dispersion and changes in dispersion over different frequencies may provide a "signature" by which to identify, monitor, and locate devices connected to an electrical power distribution network.

The system may utilize probes to extract various types of information from electrical power distribution signals as a result of connecting electrically powered devices to a home or industrial network. The system may use the extracted information to identify and approximate the location, type, and status of the devices. The probes may be plugged into available electrical outlets and, with minimal user interaction, may monitor devices, such as electrical appliances, that are connected to an electrical power distribution network and report various information of interest regarding those devices. In some implementations, a single probe may be used for basic utility, but in general a plurality of probes may be used in a cooperative manner, for example to obtain more robust results. In some implementations, some or all of the functionality of probes may also be integrated into the devices or appliances themselves.

As an example scenario, a home environment may have various electrical appliances, such as a toaster, microwave oven, or other devices, connected to a power line network. Based on an appliance turning on or off, one or more probes may detect different variations in electrical signals on the power line network. The probes may also detect changes in variations in the electrical signals as individual appliances change their locations on the electrical power distribution system, relative to the location of the probe. The system may therefore be able to determine the identities, operational statuses, and/or relative locations of different appliances in the home environment based on analyzing the variations in electrical signals.

Details of measuring electrical dispersion are described next. When an electric load is applied to a wireline network, the impedance it provides is constant for linear loads, such as in a resistor for a heating element, or is non-linear dependent solely on current level, such as in a motor where the inductance varies with the speed of the motor which varies based on the current applied to the motor.

In such cases, Ohm's law applies: V=Z*I, where V is voltage, Z is impedance and I is current. If the current is a sine wave, as may be the case in power distribution systems with frequency 50 Hz in Europe and 60 Hz in the US, and if the load is linear—or linear over short period of time—then, theoretically, the resulting voltage across the load is also a sine wave.

However, in some real-life scenarios, the observed voltage may not be a precise sine wave. Instead, it may be a pseudo-sine wave with a phase that jitters, or drifts, relative to the current waveform. The jitter, or drift, of the relative phase may be caused by the mere presence of the load (e.g., if the load has reactive components having complex-valued impedance). Further, the jitter or drift may change depending on changes in the location of the load on the system as well as changes in the power consumption of the load.

Consider a current signal that is applied through a load, such as an appliance in a home. As an example, if the current signal is a complex waveform, $I(t)=A_i*e^{\{j(wt+p_i)\}}$ with amplitude $A_i$ and phase $p_i$, then absent any effects of dispersion, the resulting voltage across the load would be a complex waveform, $V(t)=A_v*e^{\{j(wt+p_v)\}}$, with amplitude $A_v$ and phase $p_v$. The resulting impedance $Z(t)$ of the load can be determined by taking the ratio of the voltage signal and the current signal at a particular point in time, which would be a complex-valued function $Z(t)=A_v/A_i*e^{\{(wt+p_v-p_i)\}}$. In other words, the resulting impedance has a fixed amplitude and fixed phase that is a ratio and a difference, respectively, of the amplitudes and phases of the voltage and current signals. In particular, the phase of the impedance is simply the difference of the phases of the voltage and current signals, $(p_v-p_i)$, which is a constant value.

However, in some real-life scenarios, the phase of the voltage signal and the phase of the current signal may slightly drift with respect to each other. As a specific example, if the current signal input into a load is a pure sine wave, then the resulting voltage across the load may not necessarily be a pure sine wave. Instead, the voltage may be a pseudo-sine waveform that includes some jitter, or drift, in its phase relative to the input current. In other words, at any particular point in time, the current signal has a phase differential with respect to the voltage signal. As a result of this variation of phase of current relative to the phase of the voltage, the phase of the impedance will change as well. Furthermore, these deviations in phase of the impedance may change depending on the phase of the input current and depending on the frequency of the signals. Such deviations in the phase of impedance based on changes in input phase and frequency may be unexpected from the perspective of theoretical linear system theory.

As a result of this phenomenon, the measured impedance of a load may have a phase that varies in time, over the course of oscillations of the input current signal or voltage signal through the load. This effect may be observed in practical systems by measuring the magnitude of the impedance as a function of the phase of the impedance. The phenomenon described above would result in the magnitude of impedance changing as a function of phase, rather than being constant for all phases.

As described above, this variation of impedance for different values of phase of the impedance is generally referred to in this disclosure as "electrical dispersion" or simply "dispersion." Several mathematical definitions of dispersion are possible, as will be described further below. In general, however, dispersion is a general way of quantifying the amount of variability of the magnitude of impedance as a function of the phase of the impedance. If the impedance is the same value for all phases, then there is no variability of impedance, and thus the dispersion is equal to zero. If the impedance has extreme high and extreme low values for different values of phase, then the variability of impedance is large, and thus the dispersion may be a large number. Traditional linear system theory would predict the dispersion to be zero. Observation in real systems, however, show it to not be the case.

In some scenarios, the dispersion may vary with the frequency of the applied signal. For example, if the current signal that is input into a load is a sine wave, then as the frequency of the applied sine wave changes, the dispersion measured for the particular load may change. The dependence of dispersion on frequency may be unique to different loads. For example, the dependence of dispersion on frequency may depend on the type of load, the operational status or power consumption of the load, and/or the physical location of the load relative to the location of the measuring probe and relative to other devices connected to the electrical system. This dependence of dispersion on frequency, which may be characterized in numerous ways, may therefore be generally referred to as a "signature" of a particular electrical load or device. As the operational status and/or locations of the loads change, the corresponding signatures may change as well. Therefore, by recognizing and monitoring different known signatures, the system may be able to identify, evaluate, and locate particular devices that are connected to an electrical system. In general, techniques described herein may detect such signatures, and variations of those signatures, in an electrical power system to identify and monitor devices that are connected to the electrical system.

In some implementations, the impedance of the power line may be represented as a function Z(t,phi) where the phase phi is the relation to a positive zero-crossing of the power line voltage waveform. The response to a probe waveform may be represented by the dispersion genus Z(phi,f), where f is the frequency of the prove waveform. The electrical dispersion may be represented as ED(f) and defined as any suitable measurement of the variations of Z(phi) as a function of the phase phi, where phi is the phase relation to the positive zero-crossing of the voltage waveform. If the variation of Z(phi) across phi is represented as a distribution function, then the electrical dispersion may be represented as a form of statistical dispersion. The dispersion ED(f) may be defined in numerous ways, some examples of which are described below.

In some implementations, a ED(f) may be defined as a max-min difference, or the largest range of variation of impedance over all values of phase:

ED(f)=max{Z(phi,f) over phi} minus min{Z(phi,f) over phi}

In some implementations, the dispersion ED(f) may be defined using general distance measures over a suitable metric space, either over the same values of phase or different values of phase:

ED(f)=(distance measure 1(Z(phi,f) over range 1(phi))) minus (distance measure 2(Z(phi,f) over range 2(phi))).

In general, any suitable measure of variation may be used to define ED(f), for example such that greater variations in impedance relative to phase results in a greater dispersion measure.

Once the dispersion ED(f) has been defined, then the change in ED(f) over frequency may be determined. This function ED(f) may be utilized to determine various properties of devices on the electrical grid, such as the identity of the device, operational status, and/or location of the device relative to the measuring probe.

The characterization of ED(f) as a function of frequency f may be determined with any suitable level of detail. For example, in some implementations the characterization may be over a continuous range of frequencies f. As another example, in some implementations, a single dispersion value ED(f0) at a particular frequency f0 may be used to identify and monitor devices. In other implementations, a collection of dispersion values at a finite set of frequencies, {ED(f1), ED(f2) . . . ED(fn)}, may be used to identify and monitor devices.

The dispersion ED(f) may generally be any suitable measure of variability of impedance as a function of frequency. In some implementations, the dispersion as a function of frequency may include a transformation of frequency. For example, the dispersion as a function of frequency may be expressed in terms of the square of frequency, e.g., ED($f^2$), or in terms of the logarithm of frequency, e.g., ED(log(f)), or generally expressed in terms of any suitable monotonic (e.g., linear) transformation of frequency. Other examples of such transforms include the inverse Fourier transform, cepstrum, etc. As such, the definition of a signature of a device may be expressed as a general function of frequency.

Characterization of the locations of devices may be performed by determining the rate of change of the electrical dispersion as a function of frequency. The rate of change may be determined using any suitable technique. For example, in some implementations, the derivative d(ED(f))/d(f) may be calculated at a particular frequency f. In general, any suitable measure of rate-of-change may be used to determine location. The rate of change of the dispersion as a function of frequency is generally referred to herein as the Location Aware Electrical Dispersion (LAED). As an example, the LAED associated with a device that is one meter away from a probe may be different than the LAED associated with a device that is 10 meters away.

In some implementations, multiple values of LAED may be combined, for example, to improve accuracy and reliability of measurements. As an example, if the derivative of the dispersion, d(ED(f))/d(f), has the same sign within a particular range of frequencies, then LAED(f) may be defined as the average of the derivative values over the range of frequencies. In general, any suitable combination of more than one rate-of-change values of electrical dispersion may be used to define the LAED. The multiple values of LAED may be acquired from the same probe or from different probes.

Dispersion may be monitored by injecting one or more probe waveform(s) into the electrical power distribution system, and observing an output version of the probe waveform. Changes to the probe waveform may be analyzed to determine signatures of devices that are connected to the electrical system. Dispersion may be observed and measured in various ways. For example, a system may inject a probing waveform and observe the reflected probing waveform at the same point in the electrical system using the same probe device. As another example, the system may inject the probing waveform at some point in the electrical system using a first probe device, and observe the probing waveform at a different point using a second probe device. In some implementations, injection and observation of a probe waveform may be performed on the same branch circuit (same phase of the electrical circuit). In some implementations, injection and observation of a probe waveform may be performed on different branches (different phases of the electrical circuit). In the latter scenario, capacitive coupling between different branch circuits may provide useful signal levels for monitoring probe waveforms across different circuits. The above techniques, however, differ from reflectometry and transmittometry, respectively, because these techniques are not necessarily limited to requiring a precise common clock or frequency measurements. As such techniques described herein may enable the use of lower-cost probes to perform accurate monitoring of devices, potentially resulting in significant cost savings.

A probe may be located either inside or outside of a building. For example, a probe may be connected to an electrical system inside of a home or commercial building, e.g., between a breaker box and devices inside the building. In some implementations, a probe may be connected to an electrical system outside of a home or commercial building, such as between an external power supply source and a breaker box of a building. The latter scenario may enable external monitoring of devices that are located inside of a home or commercial building.

The probe may be connected to various types of electrical circuits. In some implementations, the probe may be connected to a branch circuit. In some implementations, the probe may be connected to a feeder circuit, a shared-neutral circuit, and/or a multiwire circuit. In general, a probe may be connected to any suitable electrical circuit that enables the probe to measure electrical signals that provide electrical power to one or more devices connected to the electrical circuit.

Various types of probe waveforms may be used. In general, because the signatures depend on the changes in dispersion over different frequencies, the probe waveform should encompass several different frequencies. One possible probe waveform is an impulsive signal in time that covers a broad range of frequencies. Such a probe waveform may enable monitoring a broad range of frequencies and provide a comprehensive characterization of the dispersion-versus-frequency signature, but may be difficult and expensive to implement. Another example of a probe waveform is a single sine wave, which would monitor only a single frequency point. Such a probe waveform is easy and inexpensive to implement, but the single sample point may not be sufficient to provide a signature that can be used to discriminate between different devices and locations of devices. Numerous variations are possible, such as monitoring a finite set of frequency points, resulting in a partial characterization of the dispersion-versus-frequency curve. In general, monitoring more frequency values would result in a more complete characterization of the dispersion-versus-frequency behavior of the electrical system, and thus enable better identification of, and discrimination between, particular signatures of different appliances that are connected to the electrical system. In some implementations, another variation is to perform a linear transformation of the frequency axis (examples of which include, but are not limited to, folding, reversal, compression, cepstrum, etc.). Such transformations may be reversible or not reversible.

As mentioned above, the dispersion-versus-frequency characteristics may be used to determine not only the identities and operational statuses of devices on the electrical power network, but also their physical locations, relative to the measuring probe(s). In some implementations, faster variations of dispersion as a function of frequency may indicate that the corresponding device is located closer to the probe(s).

In some implementations, a probe may be an electrical dispersion probe device (EDPD), which is a class of Self Installed Energy Monitors (SEMs). SEMs are devices that measure electrical signals and variations in the signals in an electrical power distribution network. SEMs may also be used to identify which devices contribute to the overall power levels. EDPDs in particular enable detection, characterization and location determination of devices based on electrical dispersion measurements. Inside an EDPD, a sensor, for example a Pulse Injection Probe (PIC), may inject signals into a power line network. The same EDPD or another EDPD may include another sensor, for example a Wideband Power Probe (WBPP), that observes the signal at an output point of the power line network.

The technique of measuring dispersion may therefore be an active process, whereby a probe waveform is injected into the electrical system and the output of the probe waveform is observed. In some cases, the output of the probe waveform may be observed by the same EDPD that injected the probe waveform, using reflections of the probe waveform that decay in strength at a rate $1/R^4$ with distance from the EDPD. In some cases, a second EDPD may observe a probe waveform that was injected by a first EDPD, in which case the second EDPD would receive a probe waveform that decays in strength at a rate $1/R^2$ with distance from the transmitting EDPD.

In some cases, a probe waveform may be injected on a first branch and an output may be observed on a second branch different from the first branch. In such scenarios, coupling between two different branches (phases) of the circuit may provide useful signal levels for observation. For example, a first probe waveform may be injected on a first branch (a first phase of the circuit) and a corresponding output observed on a second branch (a second phase of the circuit), and a second probe waveform may be injected on the second branch (the second phase of the circuit) and a corresponding output observed on the first branch (the first phase of the circuit). In such scenarios, capacitive coupling between the power lines of the two phases will provide useful signal levels on the opposing phase branch.

In some implementations, information detected and analyzed by the EDPD for different devices may be stored in computer memory. For example, the information may be stored in the EDPD itself, or in an associated gateway or server. The stored information may include, for example, various attributes of EDPD responses for different devices connected to the electrical wiring of a home or business where EPDPs are deployed.

The information gathered by EDPDs may be used for various purposes and applications. For example, the information gathered by the EDPDs may, in some implementations, be used to improve the performance of EDPDs. The information gathered by EDPDs may also be the basis of integration to share common electronic components such as power supplies, transformers, and/or secondary power supplies (e.g., rechargeable batteries).

Numerous variations and implementations may be used to improve accuracy and reliability of dispersion measurements. A few examples are presented below.

As one example of improving accuracy and reliability of dispersion measurements, in some cases additional information may be combined with EDPD measurements. For example, the output of the subsystem of a wireline communication system, such as power-line communication (PLC), homePNA, homeplug, VDSL, ADSL, etc., may be used to gain additional information regarding channel conditions. Such information may be combined or co-processed with the information captured by the dispersion probes to further enhancement performance. In some cases, state information may be captured from within the subsystem that results from the combination.

As another example of improving accuracy and reliability of dispersion measurements, in some examples the probing signal may be repeated and captured on a regular interval. These different measurements may then be processed together to perform signal-to-noise reduction methods, such as to reduce noise variance by averaging.

As another example of improving accuracy and reliability of dispersion measurements, in some implementations situational information such as occupancy may be used to reduce the search space of devices. In general, some devices can be associated with occupancy, such as coffee makers, fence sensors, or other types of sensors, which other devices can be associated with a lack of occupancy, such as an alarm. Yet other devices can be associated with changes in occupancy, such as a connected door locking, or a garage door being opened. In such scenarios, situation information may be used to improve dispersion estimation by providing baselines or compensating factors. The inclusion of situational information may be deterministic or statistical in nature. The inclusion of situational information may be explicit or implicit in nature.

As an example of using situational information, consider a device that enables inferring the presence, absence or change in presence. Such a device is referred to herein as a Situational Information Device (SID). Such devices may include, for example, alarm sensors, electronic locks, garage door openers, cellphones, smart phones, and intrusion location devices. In some implementations, one or more SIDs may generate information about occupancy. This information may be mapped into an index, $I_o$. The index may be communicated to one or more EDPDs. The EDPDs may take this information and retrieve a $P_d(phi, f, I_o)$. The dispersion measurement may then be adjusted according to the following equation:

ED(f)=Max((Z(phi,f)−$P_d$(phi,f,I_o)) over phi) minus Min ((Z(phi,f)−$P_d$(phi,f,I_o) over phi)

In some implementations, the EDPDs may also take the index information $I_o$ and retrieve a correction vector C(phi, f, $I_o$). The dispersion measurement may then be adjusted according to the following equation:

$$ED(f)=\text{Max}((Z(phi,f) \text{ times } C(phi,f,I\_o)) \text{ over phi}) \text{ minus Min } ((Z(phi,f) \text{ times } C(phi,f,I\_o) \text{ over phi})$$

As another example of improving accuracy and reliability of dispersion measurements, in some implementations, dispersion measurements may be improved by accounting for temperatures differences. In general, the dispersion of electrical circuitry is related to the ohmic resistance of the wiring, which may vary with temperature. The electrical wiring that carries power into a home or business may emanate from a power transformer that, in some configurations, may have wires that are exposed to the external environment and thus subject to a wide range of changes in temperature. In other cases, the wiring may be grounded and subject to minimal changes. The wiring inside the home or business is nominally at the temperature of the internal environment. Differences between the temperature of wiring that is outside and the temperature of wiring that is inside the home or business can affect dispersion measurements. Therefore, in some implementations, data regarding external temperature and/or internal temperature, such as that obtainable from storage devices or local sensors may be compared with data regarding internal temperature, such as that measured by sensors and communicated to one or more thermostats, to determine a difference in temperature of wiring outside and inside the home or business. Combining the dispersion measurements from EDPD's with such information regarding differences in temperature inside and outside the home or business may enable better calibration of the EDPDs.

As an example of using internal and external temperature, an EDPD may retrieve a baseline profile $P_d(phi, f, T\_ext)$ based on the outside temperature T_ext. The dispersion measurement may then be adjusted according to the following equation:

$$ED(f)=\text{Max}((Z(phi,f)-P_d(phi,f,T\_ext)) \text{ over phi}) \text{ minus Min}((Z(phi,f)-P_d(phi,f,T\_ext) \text{ over phi})$$

The EDPD may also retrieve a baseline profile $P_d(phi, f, T\_int)$ based on the inside temperature T_int. The dispersion measurement may then be adjusted according to the following equation:

$$ED(f)=\text{Max}((Z(phi,f)-P_d(phi,f,T\_intt)) \text{ over phi}) \text{ minus Min}((Z(phi,f)-P_d(phi,f,T\_int) \text{ over phi})$$

In some homes or businesses, thermostats may be used to control the operation of heating systems, heating pumps, and/or air conditioning units. Such thermostats may be "smart" thermostats with various electronic features, or may be simple thermostats with limited functionality. In some implementations, integrating the EDPD system within a thermostat may enable better estimation of dispersion.

As another example of improving accuracy and reliability of dispersion measurements, in some scenarios, the dispersion measurements may be timed to coincide with the turning-off or turning-on of controlled appliances. By using this correlation, an EDPD may be able to reduce ambiguity associated with recognizing the controlled devices and thus improve overall performance of dispersion measurements. For example, in some cases, a thermostat may communicate with an EDPD to align measurements with the turning-on and turning-off of controlled appliances.

Techniques described herein may be utilized in various configurations and for various purposes. For example, in some implementations, one or more probes may be located outside of the home or business, and may externally monitor the status or locations of various electrical devices connected to the electrical system inside the home or business. This may be utilized, for example, in scenarios of surveillance or monitoring by third parties, such as governmental or private organizations, that monitor a home or business.

Such a system may have numerous advantages. Appliance monitoring systems and methods may be useful to consumers, appliance manufacturers, utility companies, and/or various service providers, among others. For example, appliance monitoring systems may be used to monitor the locations of appliances connected to a power distribution network in a home or business. As another example, appliance monitoring systems may be used to understand the power consumption patterns of appliances in a home or business, the better to reduce needless power consumption and attain efficiencies, automate home functions, determine consumer behavior, as well as to identify possible faults, malfunctions or degradations in efficiency at the earliest possible occasion to avoid inconvenient or even catastrophic appliance failures.

As a particular example, users of electrical power who are billed by utility companies or other power providers in accordance with the amount of power consumed by a customer's various electrical appliances may desire to better understand and manage the power consumed by electrical appliances for economic reasons. Moreover, concerns regarding the environmental impact of the power generation process may lead consumers of electrical power to prefer to reduce their use of electrical power to reduce the negative impacts of electrical power generation upon the environment for reasons beyond the immediate benefits of potentially reduced electrical costs.

As another example of an advantage, electrical appliances that consume electrical power in a typical home or business may, to varying degrees, be prone to failure, malfunction or degradation in operational efficiency. Depending upon the particular appliance involved, malfunctions may be rare or common, and may be mildly inconvenient or catastrophic. While a malfunctioning entertainment device may be annoying, a malfunctioning washing machine or dishwasher can indicate a water leak that can affirmatively damage a structure. A malfunctioning heating or air conditioning system can lead to uncomfortable or even life threatening conditions. Further, some malfunctions involving electrical appliances or the electrical system of a structure itself may create a risk of power loss or, worse yet, fire. In some implementations, the system may enable an electrical malfunction to be identified quickly or identified as an impending problem before the malfunction occurs.

Monitoring techniques described in the present application may be used in conjunction with, or instead of, other types of monitoring techniques. For example, some electrical appliances may have built-in internal sensors, and may be able to communicate their status to a central automated management or user interface operating on a convenient platform. Such platforms may be associated with the appliance or remote from it. While the decreasing costs of electronics and communication devices may make it practical to include such monitoring in some devices, such as high-cost devices like refrigerators, or air conditioners, such built-in monitoring may not be practical for lower-cost appliances, such as toasters, basic lighting fixtures, etc. Moreover, there may exist a large installed base of electrical appliances for which retrofitting built-in sensors may be technologically impractical and unreasonably expensive even if technically feasible. In such scenarios, for example, where wide-spread adoption of monitors that are integral to electrical appliances is difficult, techniques disclosed in the present application may enable a seamless and easily-integrated solution to monitoring multiple appliances in a home or business environment.

As another example of an approach that may be used in conjunction with, or substituted by, techniques in the present application, various types of sensors may be placed in close proximity to an electrical appliance to monitor the performance of the appliances without integral monitoring sensors. For example, a probe unit may be interposed between the appliance and an electrical outlet, thereby permitting the probe unit to take measurements at the outlet in order to observe and record power consumed through it by the appliance. In some instances, such probe units may be augmented by devices that detect vibrations, sounds, or other events that provide information with regard to the operation of the appliance to be monitored. However, such an approach may require a one-to-one correspondence between monitors and electrical appliances, which may be both expensive and impractical for some applications, particularly within a home environment. Moreover, a sophisticated monitor of this type may be difficult for most homeowners to properly install or maintain. In such scenarios, as explained above, techniques disclosed in the present application may enable monitoring multiple appliances even without a direct one-to-one correspondence between monitors and appliances. In the case of multi-unit dwellings, in some scenarios this installation may be done outside a specific premise.

Another approach to monitoring the consumption of electrical power that may be used in conjunction with, or substituted by, techniques disclosed in the present application, is the installation of monitoring systems as an integral part of a building's electrical system. For example, monitoring systems may be integrated into the breaker box through which a building's electrical power is delivered, thereby permitting a reasonably close monitoring of the power consumed on the various circuits within a building. Moreover, even for new construction, the integration of specialized energy probe units within a building's electrical system may be too expensive and impractical to use in some instances, such as homes and other entities that consume relatively low amounts of electrical power.

For these reasons and other reasons, it may be desirable to provide systems and methods that enable monitoring the power consumption and/or behavior of electrical appliances receiving power in a seamless and cost-effective manner based on previously installed electrical systems.

The probe units engaged with one or more outlets of an electrical system may, in some implementations, be calibrated through the use of an electrical load having known properties to the electrical system. Because the applied load has known properties, the resulting electrical dispersion may be used to provide a model for the electrical system. The calibration load having known electrical properties may be a component of one or more of the probe units themselves, although one or more other calibration loads may optionally be provided as independent components. The calibration load may be a current source, a voltage source, a power source (e.g. adjusts current draw until a voltage indicative of a specific power consumption occurs), a resistive load, or reactive load, or a combination thereof. The calibration load may be constant, applying the same load when switched on or otherwise placed in an active state, or the calibration load may vary in a known or controlled fashion when in an active state. When in an inactive or unapplied state, the calibration load will apply either no load or a negligible load to the electrical system.

The calibration performed by probe units engaged with outlets of an electrical system may, in some cases, proceed in a coordinated fashion such that at least one calibration load is applied to each phase of the electrical system. For example, each probe unit may measure electrical dispersion for the signals at that probe unit's outlet between the hot and neutral lines and between the neutral and ground lines as each calibration load having known electrical properties is applied to the electrical system. By analyzing the electrical dispersion at the signal that occurs between the hot and neutral lines and between the neutral and ground lines while calibration loads having known electrical properties are applied to each of the phases of the electrical system, the electrical dispersion attributed to the electrical system itself, rather than appliances operating on the electrical system, may be identified and accounted for in the identification, characterization, and analysis of electrical appliances operating on the electrical system. The sequential application of calibration loads may be coordinated in a variety of ways. While examples of the sequential application of single calibration loads are described herein, the simultaneous application of calibration loads, either on a single phase or different phases of an electrical system, may be performed to obtain additional information regarding the electrical system in some implementations.

Information describing the measurements made by a probe unit, whether as part of a calibration process or in the regular operation of the probe unit, may be stored in one or more computer storage medium. The information retained in the computer storage medium may be discrete measurements, and in some cases may have time stamps associated with them and/or information, such as metadata, describing the attributes of any calibration load applied to the electrical system in conjunction with those measurements, and may additionally/alternatively include a quantification of the amount by which the observed dispersion measurement changed in response to an applied electrical load. In some implementations, a simplified or compressed form of information may be stored, which may result in more efficient data storage and retention while providing sufficient information to calibrate and operate systems. For example, the information stored may relate to a change in dispersion values associated with an event, such as the application of an electrical load to the system whether due to a calibration process or the use of an appliance, rather than the actual values of the dispersion measurements (which may require more storage space). While individual and discrete electrical dispersion measurements may be used in systems and methods in accordance with the present invention, multiple measurements may be made and combined in a fashion to provide improved accuracy and/or precision, as well as to address the inherently noisy environment of a typical electrical system. One example of combining multiple measurements is to use a simple averaging technique, but other combinations of multiple measurements may be used. Moreover, whether individual or multiple measurements are used, and however possible multiple measurements are combined, various linear and/or non-linear filtering techniques may be implemented.

One or more processing units may control the application of calibration loads having known electrical properties, the measurement of electrical dispersion or changes in electrical dispersion by a probe unit, the storage of information in any digital storage medium, communications between one or more probe units or other devices. A processing unit may also perform all or part of the analysis of collected data for both calibration and monitoring purposes.

One or more communication interfaces may permit a probe unit, for example a probe unit on a first branch circuit, to communicate with another probe unit, for example a probe unit on a second branch circuit. A communication interface may also permit a probe unit to exchange data with other devices. Other devices may include, for example, a computing device such as a smart phone, a tablet computer, a personal computer, a remote server, or any other type of device. In some examples, varying degrees of processing for techniques disclosed in the present applications may be implemented in one or more computing devices. For example, one or more computing device may perform part or all of the functions of a processing unit or digital storage medium.

One or more databases may be used to provide information for monitoring the power consumption and operation status of various appliances receiving electrical power from an electrical system. For example, a database may provide information describing the likely electrical dispersion or dispersion signatures of appliances that are likely to be operating on an electrical system. One or more processing units may compare information describing likely electrical dispersion or dispersion signatures found in such a database to the electrical dispersion or dispersion signatures actually detected and retained in one or more digital storage medium to assist in identifying appliances operating on the electrical system. In a similar manner, measurements corresponding to potential fault conditions may be provided in the same or a different database, as well as other information such as may be needed to initiate a transaction related to a detected malfunction. One or more databases of such a type may be retained in an appropriate digital form on a probe unit itself or on a computing device. In some examples, some information may be retained in a database on the probe unit itself, further information may be retained in a database in a computing device in convenient and frequent communication with the probe unit (such as in an application or "app" installed on a home owner's mobile phone or tablet), and yet further information that may be less frequently needed or subject to more frequent updating may be retained on a remote server accessed over an internet connection.

In some systems, an outlet of an electrical system may have three separate lines. A first line may carry power from one phase of the electrical system and may be referred to as the "hot" line, as it is the line that delivers electrical power to an appliance connected to that output. A second line may be a neutral line may be used to complete a circuit for an appliance engaged with that outlet. A third line may be a ground line and may be used to ground an appliance connected to the outlet for safe operation. Not all electrical systems provide a ground line. In some implementations, a probe unit may be engaged with an outlet and may monitor the voltage between the hot line and the neutral line and/or between the neutral line and the ground line of that outlet. Changes in the detected voltage between lines may be used to determine the loads placed upon the electrical system, for example by an appliance, which may then be used to determine the power consumed by an operating electrical appliance and to obtain electrical dispersion measurements describing the operational status and/or location of an appliance operating on the electrical system.

In some implementations, measurements may be made between the hot and neutral lines and between the neutral and ground lines in at least one outlet on each individual phase of an alternating current electrical system. An alternating current electrical system may be, for example, a split phase electrical system, a tri-phase electrical system, etc. Measurements may be made by one or more probe units engaged with one or more outlets of the electrical system. In some implementations, probe units may enable some appliances to receive electrical power through the probe unit, while monitoring other appliances that are not directly connected to the probe unit. For example, some appliances may be plugged into the probe unit and the probe unit may measure changes in values at the outlet while monitoring the operation of other appliances receiving electrical power from other outlets on the electrical system. As such, the system may be able to monitor multiple appliances even without a one-to-one correspondence of probe units to the appliances to be monitored.

FIG. 1 illustrates an example of a split phase electrical system such as may be found in a common home in the United States. On the right-hand side of the example in FIG. 1, power is provided into a home or business over three lines: a first hot line 101, a neutral line 102, and a second hot line 103. The three lines are connected to the local home or business through a breaker box 104. The breaker box 104 is connected to the ground 105. A set of branch circuits may provide electrical power within the home or business, with at least one branch circuit for each phase of the electrical system. For example, a first branch circuit 106 and a second branch circuit 107 may correspond to a first phase and may distribute power by extending the first hot line 101, the neutral line 102, and a ground line 105. A third branch circuit 108 may correspond to a second phase of the electrical system and may distribute power by extending the second hot line 103, the ground line 105, and a neutral line 102. A fourth branch circuit 109 may distribute higher-level voltage by extending both the first hot line 101 and the second hot line 103, as well as the ground line 105 and the neutral line 102.

A multitude of electrical appliances may receive power from the electrical system. While described generically in the present example, electrical appliances may include any type of device that operates, either continuously or intermittently, using electrical power, such as refrigerators, vacuums, kitchen ranges, hair dryers, HVAC systems, etc. In the example of FIG. 1, a first appliance 110 and a second appliance 111 are connected through branch circuit 106 along with a first probe unit 112, which may include a standalone Self-Installed Energy Monitor (SEM). A second probe unit 113 may be connected to branch circuit 106 and permit electrical power to pass to a third appliance 114. Communication between probe unit 112 and probe unit 113 may be referred to as "L2L" communication because they are on the same branch 106. On branch circuit 107, a fourth appliance 115 and an additional probe unit 116 may be connected. In this example, ground line 105 is used for safety and is not used for power distribution; however, the ground line 105 is used by the probe units to provide a voltage reference from the power distribution point.

Many form factors are possible, such as standalone probe units, integrated probe units, or distributed probe units that allocate various functions between multiple probe units or with other devices, and probe units that permit power to pass through to an attached electrical appliance. For example, in some cases an integrated probe unit may contain functionality to perform both injection of probe signals and monitoring of probe signals, using the concept of reflectometry. In other cases, injection and monitoring of probe signals may be performed by separated probe units, using the concept of transmittometry.

Still referring to FIG. 1, the third branch line 108, which corresponds to a second phase of the split phase alternating current electrical system, is connected to appliance 117, appliance 118, probe unit 119, and probe unit 120. In addition, appliance 121 is plugged into the third branch 108 through the probe unit 120. Communication between probe unit 120 and monitoring 119 is also "L2L" communication, via the common branch 108. Communication between probe units on different branch circuits, such as probe unit 113 on the first branch circuit 106 and probe unit 119 on the third branch circuit 108, is referred to as "L2N" communication. On the high voltage branch circuit 109, appliance 122, probe unit 123, and probe unit 124 are connected, with probe unit 124 providing power to appliance 125.

Various connection points may be established between different lines of the electrical system. As a few examples, connection point 126 may connect the ground line 105 to the high-voltage branch circuit 109, connection point 127 may connect the neutral line 102 to the first, second, and third branch circuits 106, 107, and 108, and connection point 128 may connect the ground line 105 with the first and second branch circuits 106 107. Other connection points may exist in FIG. 1 but are not explicitly illustrated for simplicity.

In some implementations, such as in typical operations in the United States, the alternating current electrical system shown in the example of FIG. 1 would provide 120-volt electrical power on the first phase of the system with branch circuits 106 and 107 and on the second phase of the system with branch circuit 108, and would provide 240-volt electrical power on the high voltage branch circuit 109. Inside of breaker box 104, the appropriate connections may be made between the three lines, which may emanate from a meter 129.

The systems and methods of the present disclosure may be useful in alternating current electrical systems. For example, the techniques disclosed may be utilized in split phase, tri-phase, and other alternating current (AC) electrical systems. The techniques may be applied to electrical systems delivering AC power at 50 Hz, 60 Hz, and other frequencies. Such techniques may be applied to electrical systems to electrical systems delivering AC power at 100 V, 110 V, 115 V, 120 V, 127 V, 208 V, 220 V, 230 V, 240, and other nominal voltages. The techniques may be applied to IEC 60309 systems, for example. In some cases, each phase of the electrical power system providing power to the electrical appliances to be monitored may have one or more branch circuits. In some implementations, at least one probe unit may be engaged with an outlet on one or more branch of each phase of a multi-phase alternating current electrical system, such that one or more probe unit is deployed on each phase of the electrical system. A split phase alternating current electrical system may have at least two probe units engaged with outlets on different phases, a tri-phase alternating current electrical system may have at least three probe units engaged with outlets on different phases, etc. However, in some implementations, more probe units may be used (e.g., more than one probe unit on a single phase of an electrical system) or fewer probe units may be used (e.g., no probe units on some phases of an electrical system). Further, the techniques disclosed may, in some implementations, be independent of the shape of the outlet.

In some scenarios, an electrical utility company or other service provider may deliver electrical power from a transformer or other electrical energy distribution point via multiple power lines (e.g., one line for each phase of the electrical system and a neutral line). A meter of some type may record the amount of electrical power provided as the multiple power lines enter the breaker box, fuse box, or similar component of the electrical system within the home or other structure. The breaker box (or fuse box, etc.) may provide an electrical ground and provide circuits that provide electrical power to appliances through direct wiring (e.g., for HVAC systems and other major appliances) or through electrical outlets. While most of the variations in electrical signals between lines of an electrical circuit may be attributed to electrical loads of appliances drawing power from the system, the wires and other components of the electrical system itself, from the transformer through the breaker box to the appliance itself, may consume some power that may be accounted for in accordance with techniques disclosed in the present application, thereby permitting improved accuracy in monitoring the electrical appliances operating on an electrical system via electrical dispersion measurements.

Figure 2:
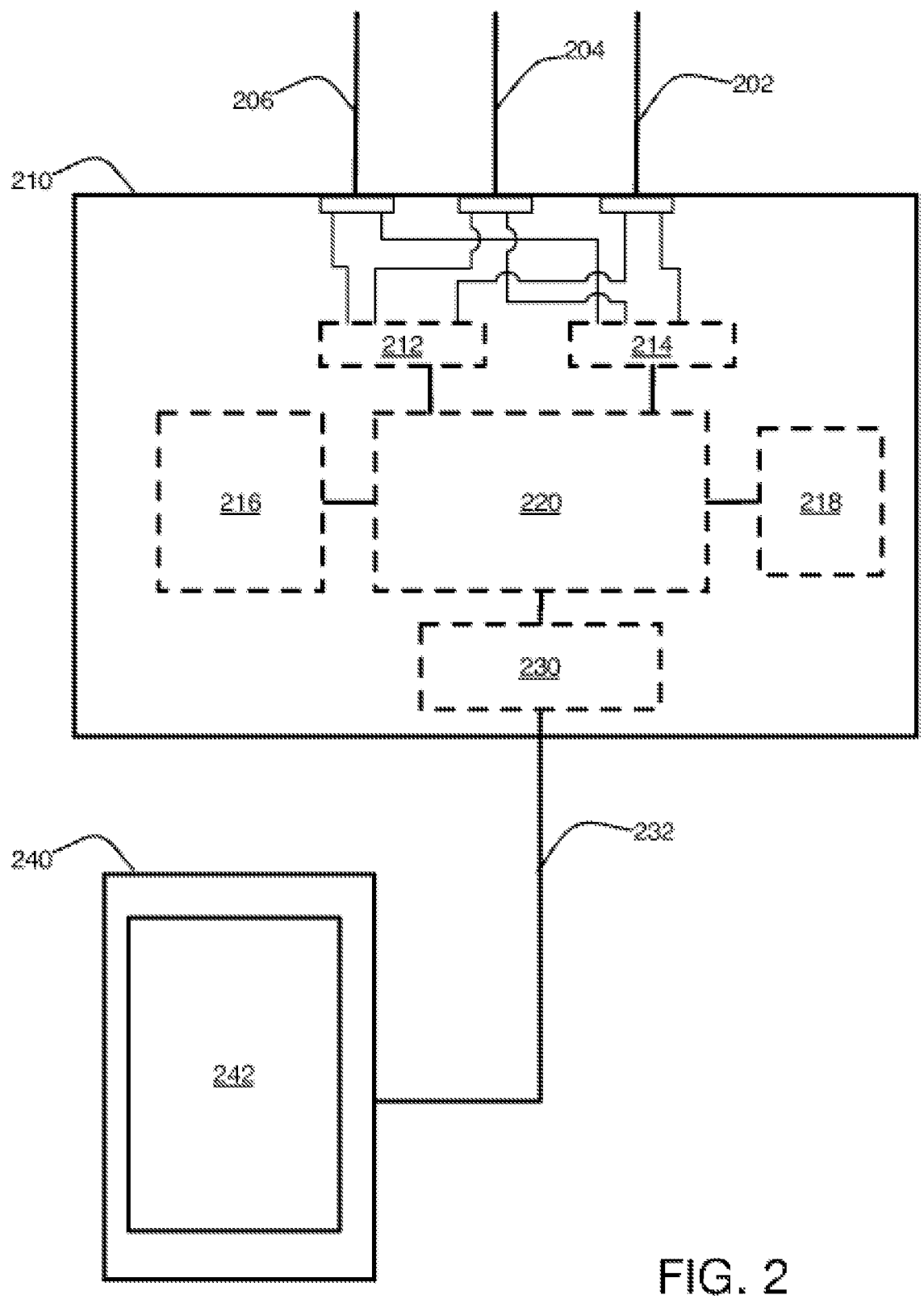
FIG. 2 is a diagram of an example of a probe unit and a computing device.

FIG. 2 illustrates an example of a SEM probe unit, such as probe unit 112, 113, 116, 119, 120, 123, or 124 of FIG. 1, that may be used to engage with an outlet of an electrical system. The example of FIG. 2 illustrates a particular implementation of a probe unit 210 that includes a large number of functional elements that may be used in monitoring appliances connected to an electrical system. As explained further below, in some implementations, the functional elements in FIG. 2 may be distributed over multiple probe units and may further be distributed over, or entirely performed by, computing devices operating separately and/or remotely from a monitoring device.

In the example of FIG. 2, probe unit 210 has been engaged with an outlet of an electrical system, which provides a hot line 202 that carries an electrical current, a neutral line 204, and a ground line 206. As described above, in some implementations, electrical dispersion is measured by injecting a probe signal into the electrical system and measuring the resulting variations of impedance, with respect to phase, at an output point of the electrical system. To implement this, in some cases both signal injection and signal extraction may be performed by the same probe unit. In other cases, signal injection may be performed by a first probe unit, and signal extraction may be performed by a second probe unit. As such, the probe unit 210 in FIG. 2 may include components that perform one or both of signal injection and/or signal extraction. For example, in some cases, the probe unit 210 may be an integrated unit that performs both signal injection and signal extraction from the same connection point in the electrical system. In other cases, the probe unit 210 may perform only signal injection or signal extraction, and may cooperate with other probe units that perform the complementary function.

In the example of FIG. 2, the probe unit 210 is illustrated with a signaling component 212. The signaling component 212 may be a component that performs both signal injection and signal extraction, or may perform only one of those functions. For example, the signaling component 212 may include a signal generator to generate a probe signal that is injected into the lines 202, 204, and 206, and/or may include a voltmeter or other voltage-measuring unit that may extract and measure voltage between pairs of lines from the hot line 202, the neutral line 204, and the ground line 206. As an example, the signaling component 212 may measure the voltage signals between the hot line 202 and the neutral line 204 and between the neutral line 204 and the ground line 206, which may then be used to determine changes in impedance and thus dispersion. In some implementations, the signaling component 212 may be particularly configured to detect changes in the voltage between pairs of lines. In this fashion, an event detection approach may be useful so that probe unit 210 only records changes in voltage (whether a single measurement or multiple measurements that are combined) that are indicative of appliances or other loads being applied to the electrical system, rather than recording a number of measurements in which the voltage between lines is not changing because the applied load is not changing.

The probe unit 210 may also have a calibration load 214 having known electrical properties that may be applied to the hot lines 202 and neutral line 204 of the outlet. The calibration load 214 may be a current source load, a voltage source load, a power source load, a resistive load, a reactive load, or a combination thereof. The calibration load 214 may be constant or may be variable. If variable, calibration load 214 may, for example, vary in time in a regular fashion or in an irregular fashion under the control of a processing unit. The application of the calibration load 214 may be coordinated with the signaling component 212 of the probe unit 210 for calibration.

While the example of FIG. 2 illustrates only a single probe unit 210, in some cases the probe unit 210 may be used in combination with at least a second probe unit, such as the multiple probe units illustrated in FIG. 1, such that the additional probe units may measure electrical dispersion due to the application of calibration load 214, while the probe unit 210 may detect the change in dispersion due to the application of a calibration load at another probe unit.

A digital storage media 216 may be used to retain information sufficient to describe the electrical signals and/or changes in electrical signals that may be detected by the signaling component 212, and/or the resulting electrical dispersion and/or changes in electrical dispersion determined based on the detected electrical signals. Digital storage medium 216 may include any type of volatile or nonvolatile machine-readable media. The probe unit 210 may also provide a database or knowledgebase 218 retained within a separate digital storage media or within the same digital storage medium 216 used to retain information describing the detected voltages and/or electrical dispersion. A database 218 may provide information useful in the identification of the electrical dispersion or electrical dispersion signatures of appliances operating on the electrical system, information describing the electrical dispersion or electrical dispersion signatures expected or anticipated fault conditions, machine learning algorithms, heuristics, and other instructions for the operation of systems and methods. A database may be, without limitation, hierarchical, relational, object-oriented, and post-relational.

A processing unit 220 may coordinate the application of calibration load 214 and the receipt and storage of measurements by signaling component 212 and the retention of information describing the measurements and/or resulting electrical dispersion and/or changes in electrical dispersion within the digital storage medium 216. In some implementations, processing unit 220 may access signal measurements detected by the signaling component 212 and calculate or otherwise determine an electrical dispersion and/or changes in electrical dispersion. Processing unit 220 may further coordinate the application of calibration loads and/or the coordination of data collection with other devices, such as other probe units engaged with other outlets on the electrical system, for example on other branch circuits. Processing unit 220 may coordinate and communicate with other probe units (optionally having their own processing units) and/or other devices through a communication interface 230.

Communication interface 230 may operate via any appropriate communication protocol, such as various 802.11 protocols, Wi-Fi protocols, Bluetooth protocols, Zigbee, Zigwave or other wireless, optical, acoustic or wired protocols. The probe unit 210 may communicate with various types of devices. One example of a device with which probe unit 210 may communicate via communication interface 230 is a computing device 240 that may be used by a user to receive information regarding the electrical dispersion and behavior of electrical appliances receiving power from the electrical system based upon measurements by the probe unit 210, as well as to input information regarding the electrical system and/or the appliances operating on the electrical system for use in calibration and other tasks, as well as to potentially control the operation of probe unit(s). Examples of computing devices 240 that may be used are smart phones, tablet computers, personal computers, cable boxes, modems, routers, gateways, and/or any other type of computing device. In the particular example illustrated in FIG. 2, computing device 240 provides a display 242 that may be used to output information to a user in a form that may be perceived by the user. For example, display 242 of computing device 240 may output information describing the operational status and/or location of appliances operating on the electrical system, potential fault conditions, etc. in some implementations, computing device 240 may be only one of several computing devices that exchange information with one or more probe units via communication interfaces. Various computing devices may have different types of outputs and different types of inputs available to them for the user. In some instances, some or all outputs regarding status, location, or other information detected in appliances, or even within the electrical system itself, may be provided with auditory and/or visual outputs.

Figure 3:
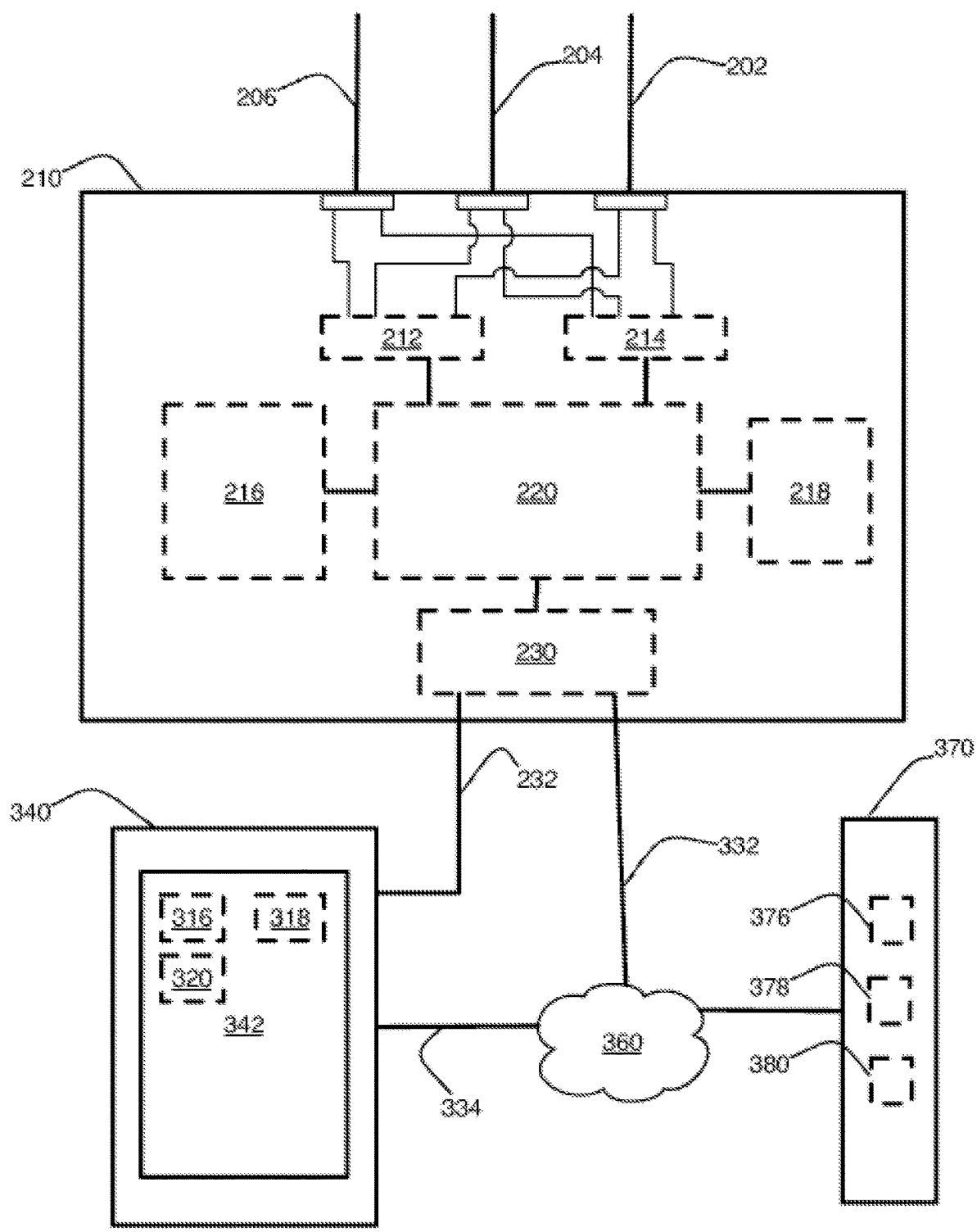
FIG. 3 is a diagram of an example of a probe unit and a computing device in communication with a remote server.

FIG. 3 illustrates another example of a system that may be used to monitor appliances connected to an electrical system. In the example of FIG. 3, a probe unit 210 such as described above with regard to FIG. 2 is provided. In addition to the probe unit 210, a computing device 340 may provide an additional digital storage medium 316, either as an augment to the digital storage medium 216 on the probe unit 210 or as a secondary repository of stored data. In some examples, only a most recent portion of data collected at the probe unit 210 may be retained within the digital storage medium 216 on the probe unit 210, with recorded data being periodically transferred from the digital storage medium 216 of the probe unit 210 to the digital storage medium 316 of computing device 340. Such a transfer may occur according to any suitable schedule, for example on a scheduled basis, or on an asynchronous basis, or on an occasional basis as information is available for transfer from the probe unit 210 and the computing device 340 is available to receive the transfer, as the digital storage medium 216 on the monitoring device 210 becomes substantially filled with data, schemas, and/or instructions.

Still referring to FIG. 3, computing device 340 may also provide one or more other forms of data storage, such as a database 318 that may be used to replace, supplement or augment the database 218 of the monitoring 210 described above. The database 318 on the computing device 340 may, for example, completely replace a possible database 218 on a probe unit 210, or may be more extensive than a database 218 on probe unit 210 in terms of the detail and amount of information provided therein. Such an external database 318 may, for example, provide for the extraction, transfer and loading of key records, tables, graphs, and/or other structures. In some implementations, a computing device 340 may contain an additional database or databases beyond a single database 318.

The computing device 340 may, in some cases, provide a processing unit 320 that performs some or all of the operations described with regard to a processing unit 220 operating on a probe unit 210, or additional operations as needed. For example, in some cases, part or all of the computation of electrical dispersion based on the detected voltage and current signals may be performed by the processing unit 320 of computing device 340. In general, all or part of controlling the operation of the signaling component 212, the calibration load 214, and/or any other components contained within probe unit 210 or other probe units may be controlled by the processing unit 320 of computing device 340 through the communication interface 230 of the probe unit 210. A processing unit (whether operating on a computing device or on a monitoring device, and whether operating alone or in combination with other processing units) may include any type of computer processor executing computer readable code to perform the operations described herein.

Still referring to FIG. 3, the system may also include one or more remote servers. For example, a remote server 370 may be accessed over a communication network 360, such as the Internet, an intranet or Virtual Private Network or other suitable form of communication medium. The remote server 370 may also provide functionality such as digital storage media 376, a processing unit 380, and/or one or more databases, such as database 378. In actual operation of some implementations, some or all of one or more of the individual types of functionality described herein may be provided at one or more of a probe unit, a computing device accessible via a communication, and/or a remote server accessible via a network. The remote server 370 may be dedicated or shared, and may be a real database or virtual database.

Figure 4:
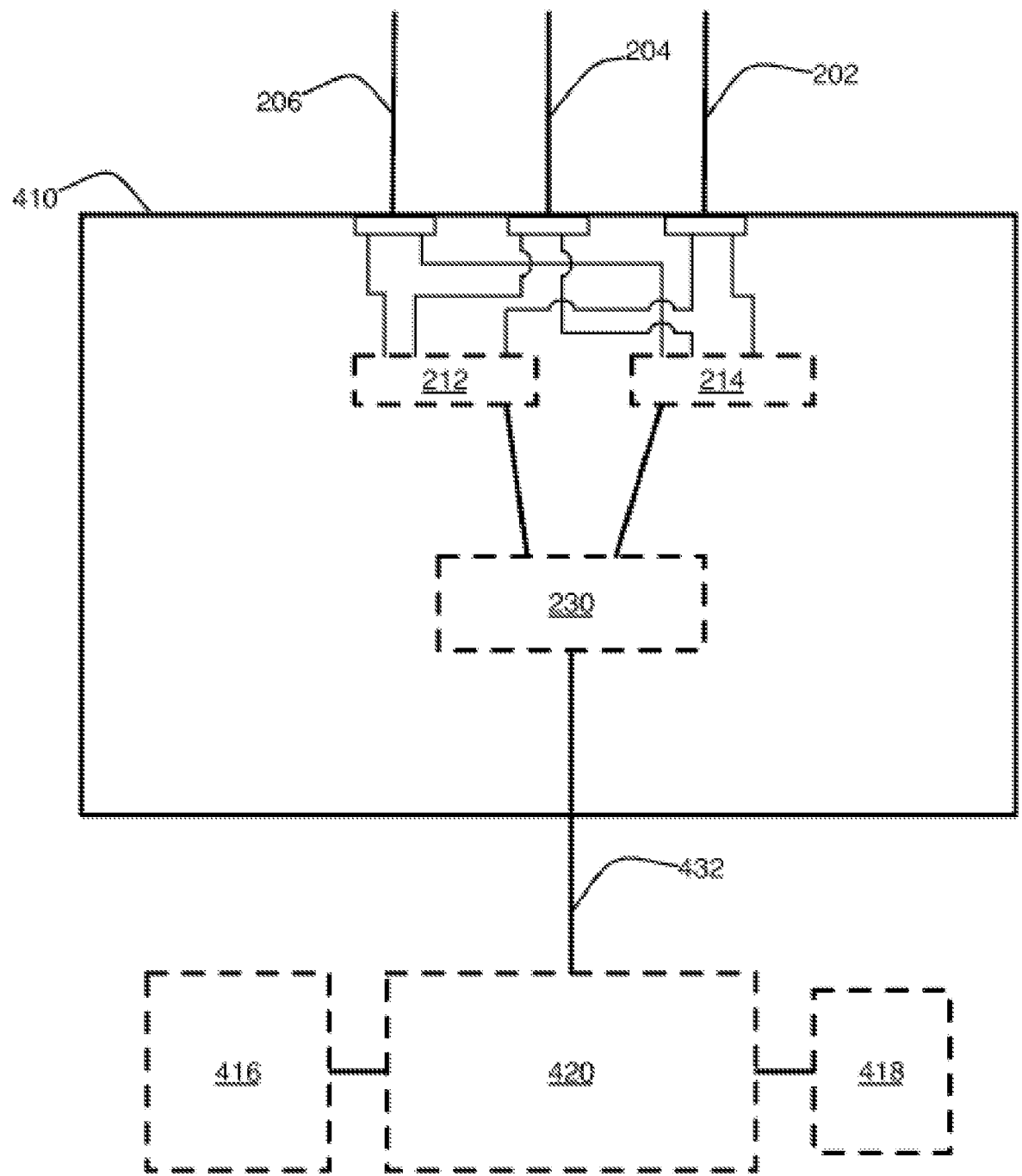
FIG. 4 is a diagram of an example of a probe unit with distributed functionality.

FIG. 4 illustrates another example of possible arrangements of various components for use in systems that monitor appliances. In the example of FIG. 4, a probe unit 410 may provide simplified functionality, including a signaling component 212, a calibration load 214 having known electric properties, and a communication interface 230. Optionally external to the probe unit 410, a processing unit 420 may perform processing and storage based on information received from the simplified probe unit 410. For example, processing unit 420 may compute electrical dispersion and/or changes in electrical dispersion based on the voltage and current signals detected by the probe unit 410. The processing unit 420 may also control the operation of the signaling component 212 and the calibration load 214 within the probe unit 410.

The processing unit 420 may access one or more forms of data storage, for example, a digital storage medium 416 and/or a database 418. The digital storage medium 416, the processing unit 420, the database 418, and/or any further elements utilized for monitoring electrical appliances may be located at various devices other than the simplified probe unit 410 illustrated in FIG. 4. For example, digital storage medium 416, processing unit 420, and database 418 may be located at a different probe unit than the simplified probe unit 410. In some configurations, the system may include a master probe unit that controls the operation of other probe units, such that the master probe unit provides all or most of the control in a processing unit, all or most of the digital storage in the digital storage medium, and/or all or most of the information regarding electrical dispersion or electrical dispersion signatures in a database. Additionally or alternatively, elements such as a processing unit, digital storage medium, and a database may be provided on a computing unit discrete from the probe unit, on a remote server, or elsewhere.

Figure 5:
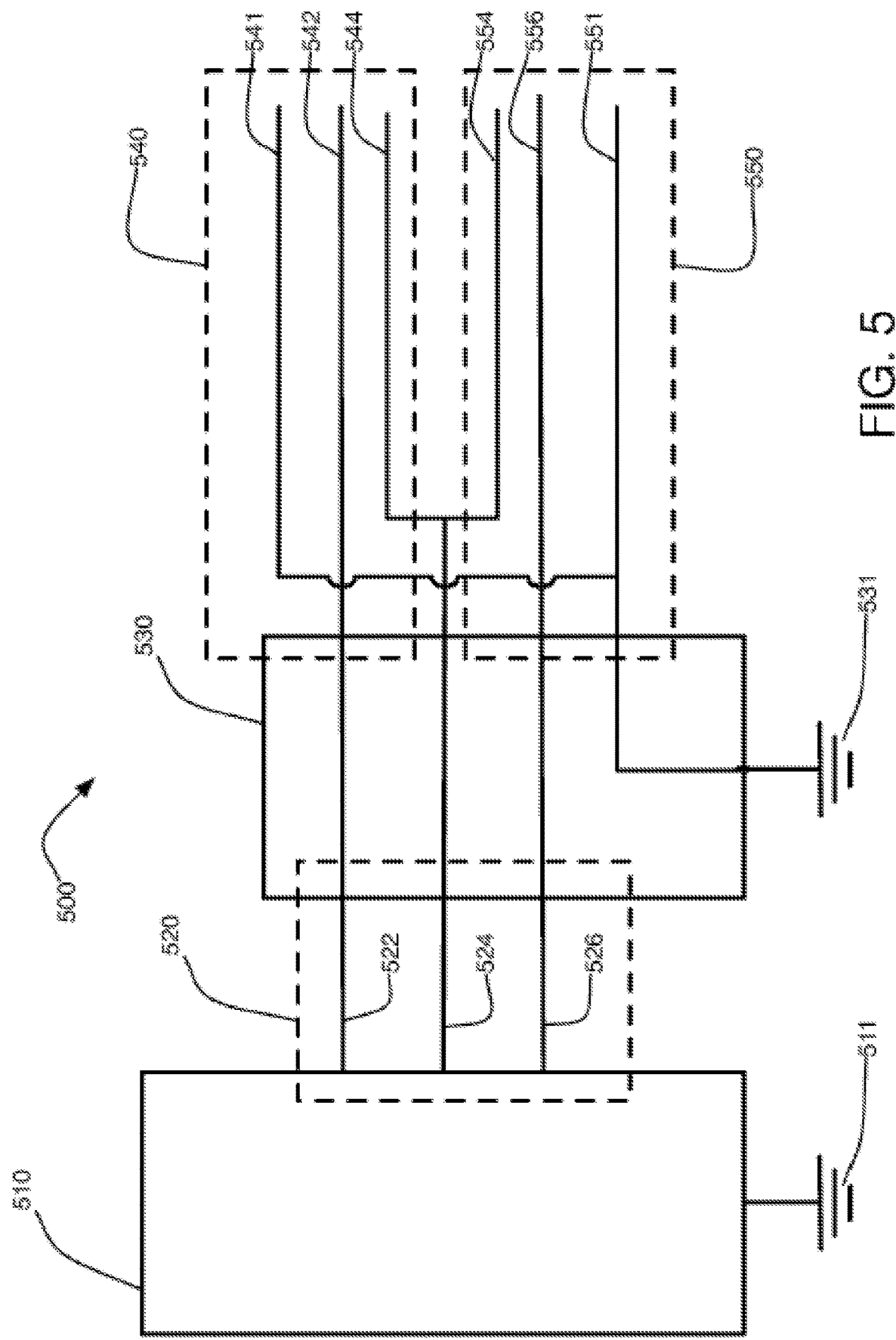
FIG. 5 is a diagram of an example of an electrical system in which calibration of probe units may be performed.

FIG. 5 illustrates an example of an electrical system 500 in which calibration of probe units is performed. In the operation of some implementations, calibration of the probe units may be performed by connecting a known load to the electrical system and measuring the effects of the known load via the probe units. For example, a probe unit engaged with an outlet may be calibrated by applying a known electrical load at the outlet and measuring the electrical dispersion for signals between the hot line in the neutral line in between the neutral line and the ground line as a result of the application of that load. Meanwhile, one or more additional probe units engaged either on the same phase or different phases of the electrical system may measure the electrical dispersion resulting from the application of the calibration load having known electrical properties at the first probe unit. After the calibration load has ceased to be applied at the first probe unit, a calibration load having known electrical properties may be applied at a second probe unit on a different phase of the electrical system. The second probe unit, the first probe unit, and any additional probe units may measure electrical dispersion as a result of the application of the calibration load having known electrical properties at the second probe unit. Probe units beyond the first probe unit and the second probe unit may likewise sequentially apply a calibration load having known electrical properties while that probe unit and the other probe units engaged with outlets elsewhere in the electrical system measure and record the resulting electrical dispersion between the hot line and the neutral line and between the neutral line in the ground line.

In some implementations, a calibration load may be separate from any probe unit. Moreover, the calibration loads provided, whether within a probe unit or separately, may not need to be identical. Further, a probe unit or other device coupling a calibration load to an electrical system may have more than one calibration load. Further, even if all calibration loads are provided with a probe unit, some probe units either may lack a calibration load or not apply the calibration load for some operations. Also, while the above example describes the sequential application of calibration loads, the coordinated simultaneous or partially simultaneous application of calibration loads may be implemented.

A processing unit, which may be located at one or more of the probe units or on a separate computing device, may use the measured electrical dispersion by the various probe units during the application of the various calibration loads having known electrical properties to identify electrical properties of the electrical system to which the probe units are engaged. For example, by comparing the electrical dispersion of signals between the neutral line and the ground line and the electrical dispersion of signals between the hot line into the neutral line on different phases of the electrical system when calibration loads are applied to only one of the phases of the electrical system, the electrical dispersion due to the electrical wiring, particularly between a transformer and the breaker box of the house (or business) or other structure can be determined. As such, this calibration may, in some implementations, account for the effects of the internal wiring of the electrical system and permit a more accurate determination of the electrical dispersion caused by appliances that are connected to the electrical system.

In some implementations, during the monitoring operation of probe units, the calibration load(s) having known electrical properties are not applied. During monitoring use, the probe units may detect electrical dispersion of signals between the hot and neutral lines and between the neutral and ground lines of the outlet with which each probe unit is engaged. A processing unit may then take a combination of one or more of the electrical dispersion measurements and determine various properties, such as the identity of the electrical appliance causing the electrical dispersion, the operational status of the electrical appliance, and/or the location of the electrical appliance. As noted above, a measured electrical dispersion or a measured change in electrical dispersion that is used for calibration and/or monitoring may include an individual discrete measurement or a combination of measurements.

In some implementations of a split phase electrical system, such as in residential electrical systems in the United States, and in the particular example of FIG. 5, a transformer 510 may provide electrical power to a home or business, or other structure or unit, via a breaker box 530 or a fuse box. Electric power may be provided from the transformer 510 through a section 520 via a first line 522, a second line 526, and a neutral line 524. The transformer 510 may be connected to a ground connection 511. Further, the breaker box (e.g., a fuse box) 530 may also be connected to a ground connection 531. In the example of FIG. 5, two different branch circuits are shown, branch circuit 540 and branch circuit 550, each having different phase of the electrical system.

For example, the first line 522 is used as the hot line 542 of a first branch circuit 540 of the electrical system, the neutral line 524 may be used as the neutral line 544 of the first branch circuit 540, and a ground line 541 may also be provided for on the first branch circuit 540. Meanwhile, the second branch circuit 550 of the electrical system may be formed using the second line 526 from the transformer 510 as the hot line 556, the neutral line 524 from the transformer 510 as the neutral line 554, and a ground line 551 from the breaker box 530. Due to the impedance of wires and any other components in the electrical system, an electrical dispersion of some amount may occur between the transformer 510 and the breaker box 530 in section 520 of the electrical system 500.

To isolate the electrical dispersion occurring on either the first branch circuit 540 or the second branch circuit 550 of the electrical system, such as caused by the application of a load by an operating electrical appliance, calibration of the probe units may be performed by isolating the electrical dispersion in section 520 from the change in electrical dispersion observed by a probe unit deployed on that branch circuit of the electrical system. By comparing the electrical dispersion measurements during the application of a calibration load on the first branch circuit 540 of the electrical system at both an outlet of the first branch circuit 540 and an outlet of the second branch circuit 550, and then performing similar electrical dispersion measurements while a calibration load is applied to the second branch circuit 550, the electrical dispersion occurring in section 520 between the transformer 510 and the breaker box 530 may be isolated from any electrical dispersion occurring due to appliances operating on one or both of the either the first branch circuit 540 and the second branch circuit 550 of the electrical system.

Accordingly, by estimating and/or excluding electrical dispersion occurring due to the resistance of the wiring and other elements of the electrical system itself, a more precise identification and quantification of the operational status and/or location of electrical appliances operating on the branch circuits of the electrical system may be obtained. While FIG. 5 illustrates an example with only two branch circuits, and thus only two phases of the electrical system, and with no high voltage circuit illustrated, the principles described with regard to the example of FIG. 5 may be applied to more complicated electrical systems. For example, although FIG. 5 illustrates an example of a split-phase alternating current system, the techniques described may be used with other types of electrical systems, such as tri-phase electrical systems.

Figure 6:
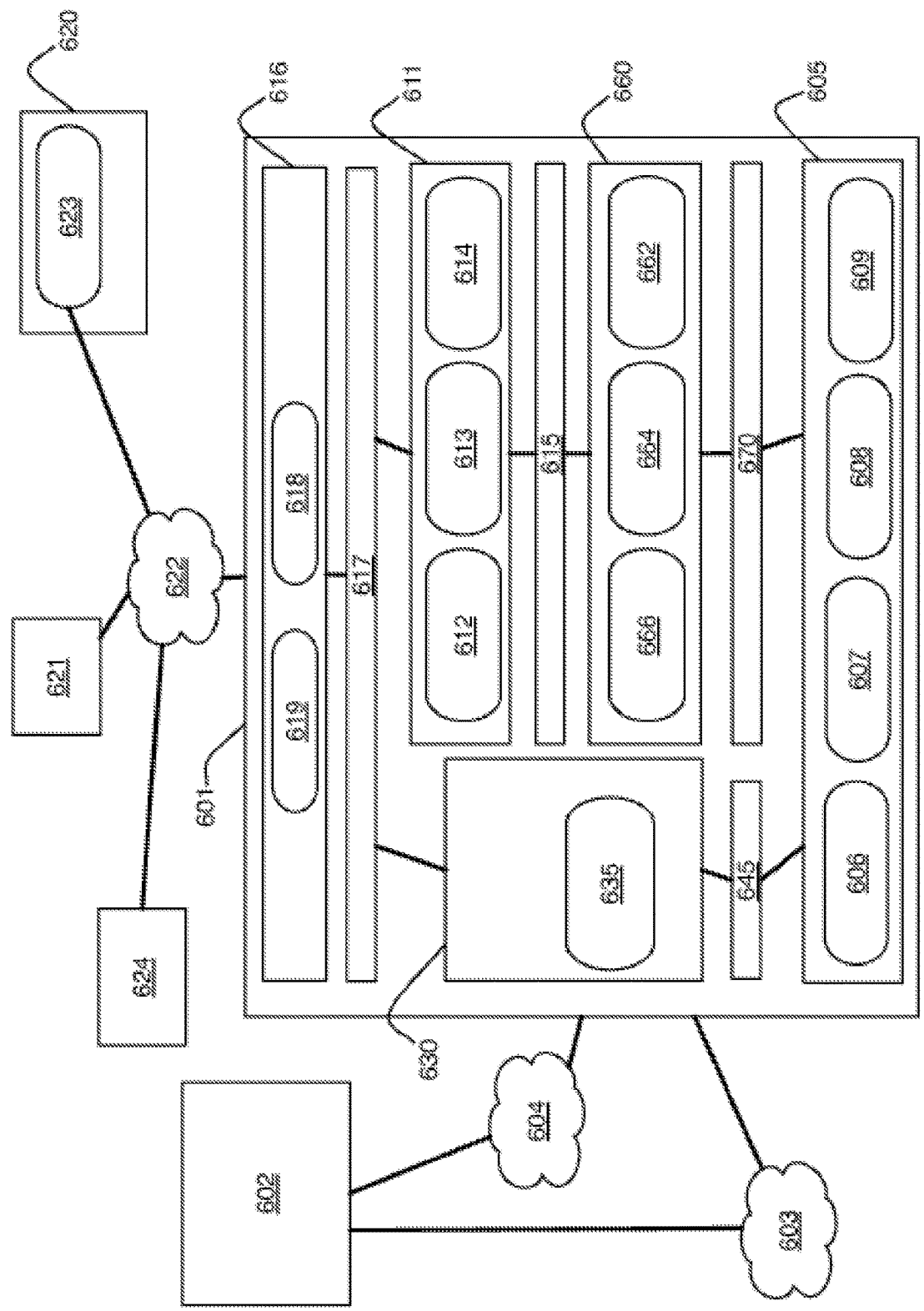
FIG. 6 is a diagram of an example of various components that may be used in processing data for monitoring appliances connected to an electrical system.

FIG. 6 illustrates another example of various components that may be used in processing data for monitoring appliances connected to an electrical system. In the example of FIG. 6, two probe units are illustrated, probe unit 601 and probe unit 602. In the example probe unit 601, various blocks of functionality are depicted, such as may be the case for examples such as that described with regard to FIG. 2, above. However, also as described above with regard to FIGS. 3 and 4, various types of functionality may be split among numerous probe units, or may be distributed between probe units, a computing device and/or a remote server, or may entirely be located at a computing device or a remote server.

In the example of FIG. 6, a system and service architecture are illustrated based on deploying probe units on an electrical system, including functional elements that may be located inside a probe unit or in other computing devices. It should be noted that these functional elements are not necessarily mapped to particular physical or logical components. Further, these functional elements may be distributed between multiple devices or components of devices. In this example, probe units 601 and 602 are connected to a power grid 603. The probe units communicate with each other through a communication medium, such as a local area network 604. The network 604 and power grid 603 may be supported by the same or different infrastructure.

The probe unit 601, as well as probe unit 602 or any additional probe units, may provide a series of processing items 605, such as a signal processing engine 606 configured for frequency domain processing, a signal processing engine 607 configured for amplitude domain processing, and a block of hardware elements 608 and a block of software components 609. Other types of processing items may be included. The processing items 605 may be used for a multitude of purposes, and may allow the processing of algorithms in series or parallel in real or near-real time. Processing items 605 may also utilize a synchronization method to operate.

In some implementations, processing items 605 may interface with a classification/detection functional block 660 through an interface 670. The classification/detection block 660 may provide a device awareness subsystem 662 responsible for managing the identification of devices plugged-in or pluggable on the power grid 603. This identification can be based on, for example, a combination of power, current, noise, voltage, harmonic, current, timing, synchronicity, phase, and/or impedance attributes. Many suitable devices can be identified, such as washing machines, microwave ovens, industrial motors, lighting systems, etc. In some implementations, if some devices, such as vacuum cleaners, are not always plugged in to the power grid 603, then the set of devices tracked can be more extensive than what is installed in the house, business, multi-dwelling building, or plant where the system is deployed.

The classification/detection block 660 may also include a topology awareness block 664 that deals with reflectometry support, transmittometry support, management of the different branches of the network, multiple phases, and/or relationships between probe units, and between probe units and elements of the grid. The event awareness block 666 manages events such as turn on/off, changes of modes of operation, and/or devices plugged-in or unplugged. The device awareness module 662 may deal with background signals whereas the event awareness module 666 may deal with transient signals.

In some cases, the classification/detection block 660 may interface with a compressive sensing block 611, which may extract relevant qualitative and quantitative attributes from detected signals. Compressive sensing block 611 may, for example, provide a data compression block 612, which may be multidimensional, configured to reduce storage and communication requirements for other functional elements. The compressive sensing block may also include a data and attributes management block 613, which manages objects, e.g., a store manager, and a heuristic block 614 that captures object matter rules. In some implementations, the probe unit 601 may also an auxiliary block 635 that implements additional functionality not related to power, such as alarm or alert management.

The probe unit 601 may also include a logic application processor 616, which may be communicative with the auxiliary block 635 and the compressive sensing block 611 via an interface, such as application processing interface 617. The application processor 616 may include non-volatile memory 618 and instruction code 619, which may be used to perform some or all of the functionality described herein.

The probe unit 601, as well as probe unit 602 and/or other probe units, may be supported by one or more data analytics engines, such as data analytics engines 620 and 621, connected to the probe units via an appropriate communication medium 622 such as the Internet or an intranet or VPN. The probe unit 601 may be connected to the data analytics engines 620 and 621 directly or may be connected indirectly through a relay. A data analytics engine such as data analytics engine 620 may include one or more application programs 623. One or more service providers, such as service provider 624, may use the results from the analytics engines 620 and/or 621 to support consumer, commercial, and industrial services.

In some implementations, various types of filtering may be performed on signals that are measured, using linear and/or nonlinear filtering techniques. Such filtering may be used, for example, to improve reliability and accuracy, simplify calculations or reduce the amount of data to be stored, or for other suitable reasons.

In some cases, configuration information may be used to improve the estimate of dispersion. Such information may include, for example: the distance of the circuit breaker to the transformer; the number of circuit groups to the transformer; the sizes of wires; circuit breaker amperages; the number of plugs; multi-dwelling information; description of load devices and relevant attributes; description of expected devices being powered; description of probe units, including manufacturer-based information; and/or information regarding outlets on the branch.

In a power grid with a battery-backed system, integration with battery switching or a replacement battery may be implemented.

Various types of statistical operations may be used to determine changes in operational status and/or location of appliances as they correspond to changes in observed electrical dispersion. Some examples of such statistical operations include correlation, joint probability, Point Mutual Information (PMI), closeness, distance, and pseudo-distance measurements, among others.

In some implementations, electrical dispersion signatures may be stored in computer memory to aid in identification of specific equipment. The contents may be available as known instances from a general repository, or may be derived locally as they are associated automatically or with user assistance. The signatures may be one out of a series of signatures that are known for a particular device type. The series of signatures may depend on TOD (Time of Day), DOW (Day of the Week), WOY (Week of the Year), or any other suitable time frame. The signatures may be stored locally or downloaded from a remote repository as needed.

Figure 7:
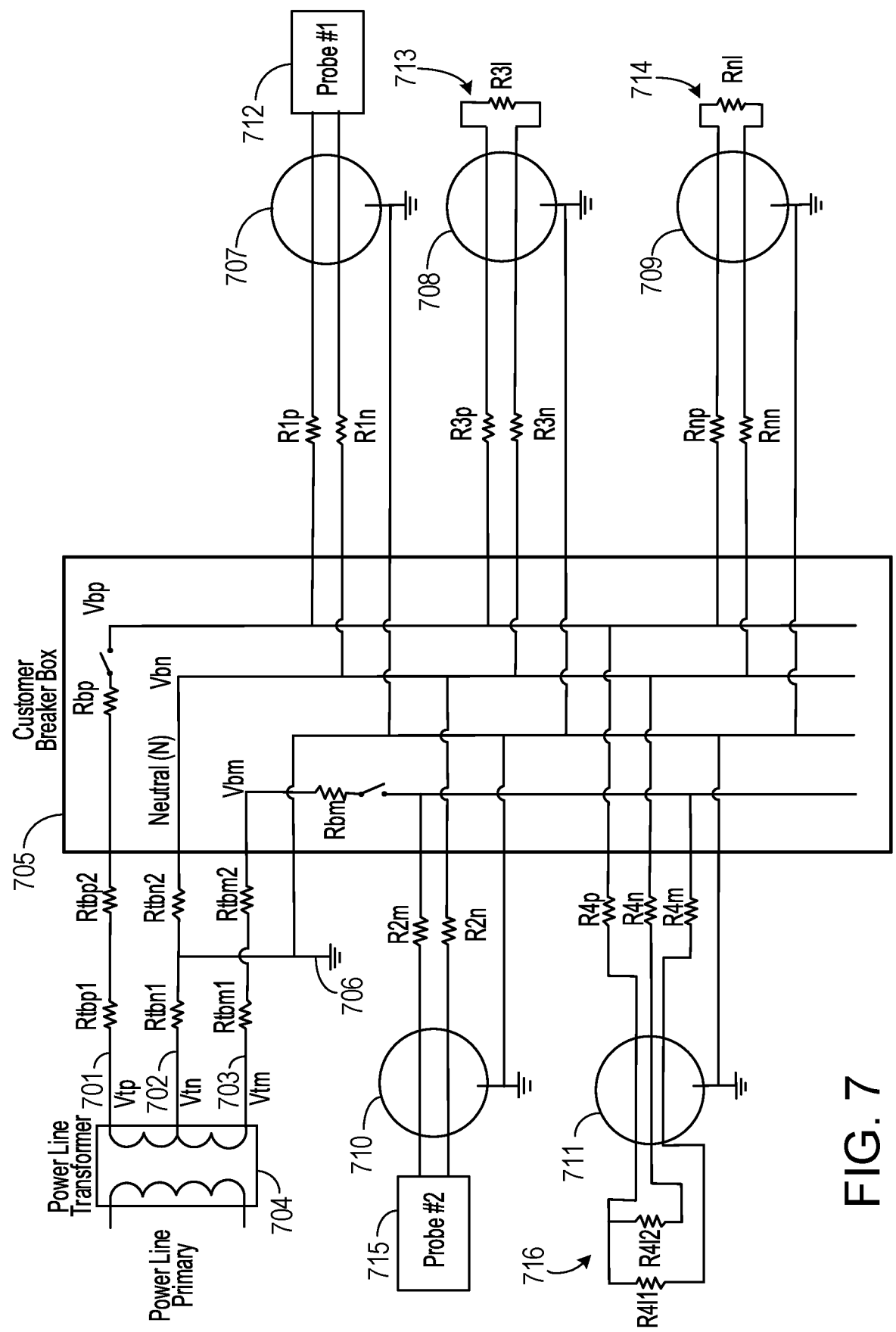
FIG. 7 is a diagram of further details of an example of a system in which monitoring and/or calibration may be performed.

FIG. 7 illustrates further details of an example of a system in which monitoring and/or calibration may be performed, such as the example illustrated in FIG. 1. As in FIG. 1, the example of FIG. 7 illustrates three lines that transfer power from an external power line into a home or business: a first hot line 101, a neutral line 102, and a second hot line 103. The three lines 101, 102, and 103 may receive power from a power line transformer 104, and deliver the power to a customer break box 105, which may be connected to a ground connection 106. The breaker box 105 then distributes power amongst different branch circuits in the home or business. In the example of FIG. 7, five different branch circuits are illustrated, branch circuits 107, 108, 109, 110, and 111, which distribute power to probe 112, appliances 113 and 114, probe 115, and high-voltage appliance 116, respectively.

Each of the three wires 101, 102, and 103 may have various values of resistance at different points along the wire, such as Rtbp1, Rtbp2, Rtbn1, Rtbn2, Rtbm1, Rtbm2, Rbp, Rbm, as illustrated in FIG. 7, which may contribute to the built-in impedance of the electrical system. Each of the appliances may also have some load or resistance, such as R3l, Rnl, R4l1, and R4l2, which contribute to the impedance effect of the loads when they are connected to the electrical system. Such impedance effects may be determined based on electrical signals that are detected by probes, such as probes 112 and 115. Probe 112 and/or 115 may be, for example, EDPD probes that may be self-contained with all the functionality to perform monitoring and calibration, or that may contain partial functionality, with other functionality implemented by separate devices. For example, a single probe may perform both injection of signals and monitoring of signals, or may perform only one or the other.

As an example, consider a simple on/off switch, such as a lamp module, that may be used to turn lights on and off for safety and/or convenience. Communication from a controller may be achieved through a wide range of wired or wireless communication. They include, and are not limited to, X1, homePNA, homeplug, 802.1x series, Bluetooth and the like. The controller manager may have a representation of the location of the lights, e.g., a salon light, a kitchen counter light, etc. The location of the EDPDs may also be known and the combination of these references allows EDPD location detection to be improved over single EDPD location detection. This may be achieved by noting that the rate of changes in the dispersion measurement over some specific ranges of frequency is a monotonic function of the distance between EDPD and the device (or set of devices) being monitored. In such cases, within the ranges of frequencies, the LAED remains positive with distance or remains negative with distance.

In some implementations, an electrical circuit may have the following devices connected to it in the following order of sockets: EDPD1, device A, device B, lamp module C, device D, lamp module E, device F, and EDPD 2. Assume that the frequency range for which this circuit has a monotonic relationship in distance is the frequency range F1 to F2. In such scenarios, assume that the devices A, B, and D have been identified. Also assume that probes EDPD1 and EDPD2 are capable of communicating with a light switch controller, which in turn controls lamp modules E and C. Then the probes EDPD1 and EDPD2 may be turned on at will by the light controller.

Consider the scenario where the probe EDPD1 has detected that device A was previously off and turned on, that device B is off, that device D is off, and that device F is off. Assume that the LAED computed is LAED_C_off. If the light switch controller turns lamp module C on, then the probe EDPD 1 measures the LAED to be LAED_C_on. Based on the relative values of LAED_C_off and LAED_C_on, the probe EDPD1 can determine that device A is closer to the probe than lamp module C. Similarly, the probe EDPD 1 can perform a similar analysis with respect to lamp module C and lamp module E.

Consider a scenario where the probe EDPD1 has detected that device A is on, device B is off, device D was previously off and turned on, and that device F is off. By turning lamp module C on, the probe EDPD1 may determine that device F is located at a greater distance from EDPD1 than lamp module C. Similarly, the probe EDPD2 may determine that device F is located at a greater distance from the probe EDPD2 than module E. The controller may thus determine that device F is located between lamp module C and lamp module E. Such techniques may be helpful, for example, in a situation where multiple devices of the same type, such as televisions or computers, are connected to the same circuit. Similar technique may be applied to micro-switches.

FIG. 8 illustrates an example of a configuration for measuring impedance relative to the power line voltage phase. In the example of FIG. 8, various load devices, such as appliances, may be connected to different outlets of the electrical power distribution system, such as outlets 801, 802, 803, and 804.

A first probe unit, such as probe unit 805, may be configured to inject probe waveforms into the power line to allow measurement of line and load characteristics. In this example, the probe unit 805 may inject signals into either outlet 801 or outlet 804. A second probe unit, such as probe unit 806, may be configured to extract signals from the power line for evaluation. The signals may be extracted in particular frequency bands, or at particular frequency points.

The analysis of the extracted signals may be performed either inside the probe unit 806, or may be performed in a separate device, such as analyzer 807. Such analysis may include, for example, determination of impedance Z(phi,f) at different values of phase and frequency, determination of electrical dispersion ED(f) for different frequencies, and/or determination of the location-aware electrical dispersion, LAED.

In this example, a time reference is used to make measurements relative to a power line phase or to allow extraction of power line phase from acquired test data. In some implementations, a time reference may be achieved by using an oscilloscope trigger output with a pulse generator that has a variable trigger delay, namely the time between the input trigger pulse and the generator output pulse. The variable delay may be used to give a generator output pulse at the power line upward zero crossing or a time relative to the upward zero crossing. Alternatively, the power line voltage may be recorded along with the impedance data and the impedance-versus-power line phase may be calculated through acquisition software.

In some scenarios, the measurement time may be kept short relative to the period of the power line cycle, and only a narrow frequency range may be acquired in each network analyzer measurement. Manual measurements may be made by limiting the number of sample points—either the network analyzer frequencies measured or the number of frequency points relative to the power line phase. In some implementations, computer control may be used to facilitate such operations. For example, a computer may control the network analyzer center frequency and acquire data at that frequency. The computer may also control the pulse generator delay time through software.

In some implementations, the probing waveform may be designed to accommodate low-cost PICs. To accomplish this, the signal may be generated on simple circuits, such as pulses generated from high level and low level outputs of a bi-stable circuit or a sine wave generated from a local oscillating source. In some implementations, a Pulse Width Modulation (PWM) waveform may be generated by the probe, and a low-pass filter of a separate element may be used to extract the probe signal. This may be useful, for example, if a capacitive system is placed between the EDPD probe and the circuit being monitored (e.g., such a capacitive system may be used as an insulator, extending the voltage range of operation of a probe).

Figure 9:
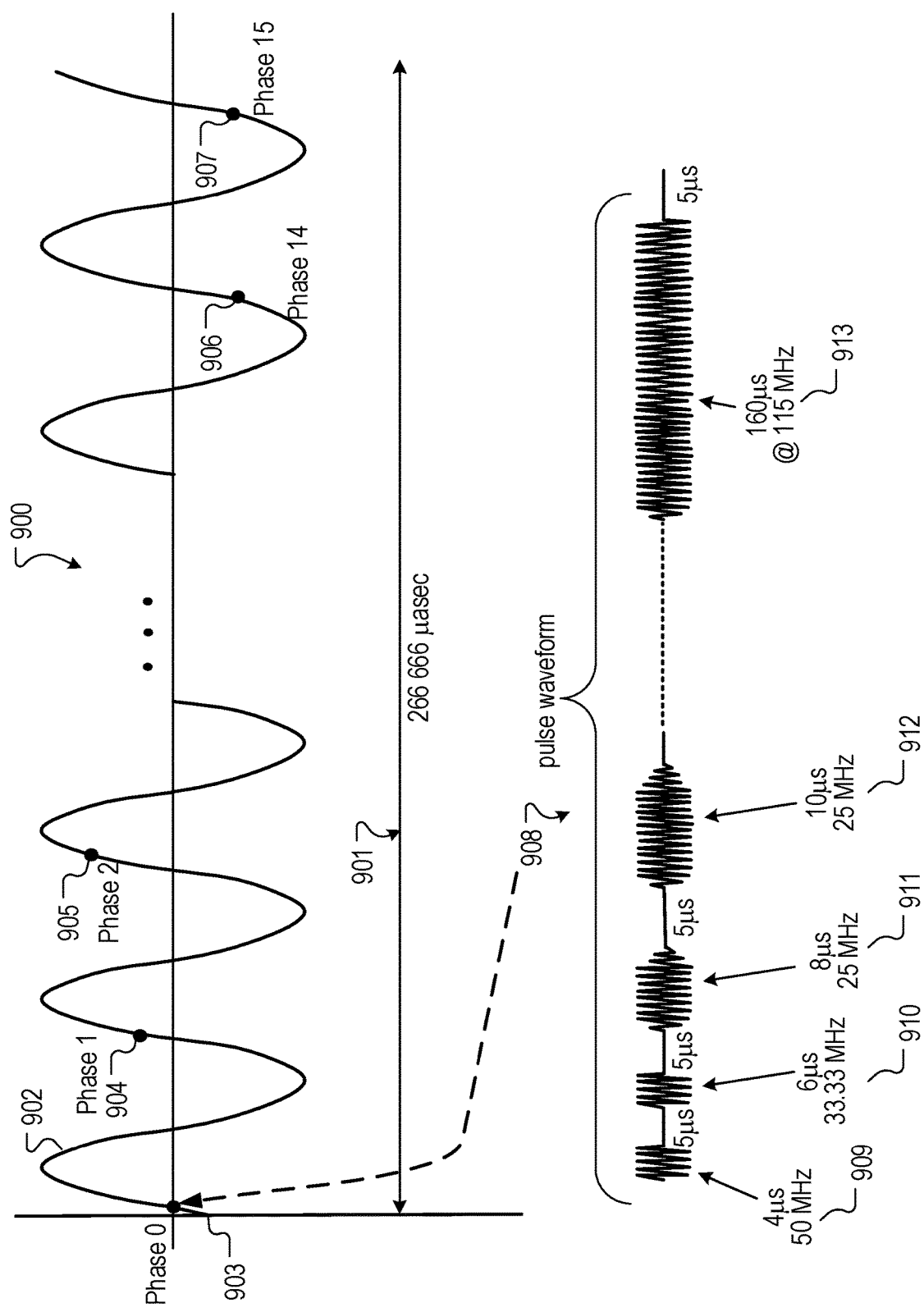
FIG. 9 is a diagram of an example of a waveform that may be used for probing.

FIG. 9 illustrates an example of a waveform used for probing. In this example, the probe waveform 900 covers multiple frequency bands and multiple relationships with phase. The probe waveform 900 includes a probing event 901 that may be used to obtain one possible characterization of devices that are connected to the electrical network. The probing event 901 may be a signal that spans a suitable duration of time and enables measurement of dispersion in the electrical system. In the example of FIG. 9, the probing event 901 includes a number of pulse trains that are injected at various different phases relative to the underlying power line signal 902. In this example, probing event 901 includes 16 pulse trains, injected at phase points 0 through 15 of the power line signal 902, of which 5 phase points are illustrated, labeled phase points 903, 904, 905, 906, and 907. Therefore, the first pulse train is injected at phase point 903, the second pulse train is injected at phase point 904, etc. In general, any suitable number of pulse trains may be used to probe greater or fewer phase points.

Each phase point corresponds to a particular period, or cycle, of the power line signal 902. Therefore, the overall duration of the probe event 901 is 16 periods of the power line signal. A single period of the power line signal 902 has duration 16.666 msec in this example, corresponding to a 60-Hz frequency for AC electricity in the United States. Therefore, the overall duration of the probe event 901 is 16*16.666 msec=266.666 msec.

As described above, each of the 16 pulse trains in FIG. 9 is injected into one of the 16 phase points of the power line signal 902. In each pulse train, as described in more detail below, multiple different frequencies are included. As such, each of the 16 pulse trains enables determining the electrical dispersion for different frequencies at the particular phase point to which the pulse train is applied. Together, the 16 pulse trains are therefore able to probe multiple different phase points with multiple different frequencies and measure the corresponding electrical dispersion at different phase points for different frequencies. Therefore, a single probe event 901 is able to provide a characterization of changes in dispersion with respect to phase, as a function of frequency. This characterization, as explained above, enables determining the identity, operational status, and/or location of particular devices connected to the electrical system. For example, variations in the EDPD over time can be used to determine that a specific appliance has been moved from one location to another in the electrical system.

In the example of FIG. 9, the first pulse train is illustrated as pulse train 908, which is applied at the first phase point 903. As noted above, pulse train 908 is able to inject multiple different frequencies into the first phase point. It does so by having a series of pulse bursts, each burst at a specific frequency. In this example, the pulse train 908 has 12 pulse bursts, of which 5 bursts are illustrated, labeled pulse bursts 909, 910, 911, 912, and 913. In general, any suitable number of pulse bursts may be included in a pulse train to probe greater or fewer number of frequencies. Each pulse burst is transmitted at a different frequency. For example, pulse burst 909 is transmitted at frequency 50 MHz, pulse burst 910 is transmitted at frequency 33.33 MHz, pulse burst 911 is transmitted at frequency 25 MHz, pulse burst 912 is transmitted at frequency 20 MHz, and pulse burst 913 is transmitted at frequency 1.15 MHz. Each pulse burst contains the same number of cycles, so as to enable consistent measurements for each pulse burst. This fixed number of cycles, in view of the different frequencies of each burst, results in each pulse burst having a different duration, with higher-frequency bursts having shorter duration. In the example of FIG. 9, each burst includes 200 cycles, or transitions, although any suitable number of transitions may be used in a burst.

In some implementations, to enable each pulse train to fit within a single cycle, or period, of the underlying power line signal, the parameters of the pulse train may be chosen such that the overall duration of a pulse train is less than a single cycle of the power line signal. Since most effects of dispersion are repetitive across different cycles of the power line signal, this enables a single pulse train to obtain useful measurements for a single cycle of the power line signal, at a particular phase point of the cycle. For example, the parameters of the pulse train may include the number of cycles in a single burst of the train, the frequency of each burst, and the total number of bursts in a pulse train. In the example of FIG. 9, a single period of the power line signal 902 has duration 16.666 msec, corresponding to a 60-Hz frequency for AC electricity in the United States. Therefore, for 12 bursts in a pulse train, the frequencies and number of cycles in each of the 12 bursts may be chosen according to the table below, so that the overall pulse train fits within a single 16.666 msec period of the power signal 902.

FIG. 10 illustrates an example of characteristics of a probe waveform, such as the example probe waveform of FIG. 9.

Between each burst of a pulse train may be inserted a gap, or guard time, of non-transmission. In this example, the gap is 5 microseconds in duration, although any suitable duration may be chosen.

As explained above, dispersion across cycles of the power line signal is repetitive. Therefore, in some implementations, each phase point may be repeated over multiple cycles to achieve more reliable and accurate measurements at each phase point.

In some implementations, current clamps may be used in series (e.g., inductively coupled) with the electrical circuit, for example, at a close proximity to the circuit breaker box. The current signal I(t) may be measured at the same time that the EDPD pulse is generated. Because impedance is the ratio of voltage to current, direct access to current measurements enables determining the electrical dispersion in terms of the relevant variations of the voltage. Due to the underlying variations of the power line signal 902, the EDPD may compensate for the variations of voltages in the sine wave signal 902, and thus isolate the effects of the pulse trains in the probe event.

In some implementations, the integrated current clamp and EDPD device may measure the current signal I(t), and measure the average voltage amplitude Va over a particular period of time, for example using sample-and-hold circuitry or sample-and-hold-with-latch circuits. Thus, an approximation of the instantaneous impedance $Z_i(t)$ may be obtained through a simple division of the average voltage $V_a$ by the instantaneous current I(t).

To avoid pathological cases created by a division by zero, in some implementations, a time window around the zero crossing of the current signal I(t) may be implemented, so that the impedance Z(t) is set to an unknown or indefinite value for a certain amount of time around the zero crossing. For example, if we refer to $t_i[n]$ as the n-th zero-crossing time of the current signal I(t), and refer to $w_o$ as the time window around the zero-crossing in which computation is deemed invalid, then the instantaneous impedance Z(t) may be defined as $Z_i(t)=V(t)/I(t)$ when $t_i[n]+w_o/2<t<t_i[n+1]-w_o/2$ for some value of $n$ $Z_i(t)$=undefined otherwise The impedance Z(t) may then be Fourier transformed, binned, windowed and binned to extract the Z(Phi, f) and thus processed accordingly.

Figure 11:
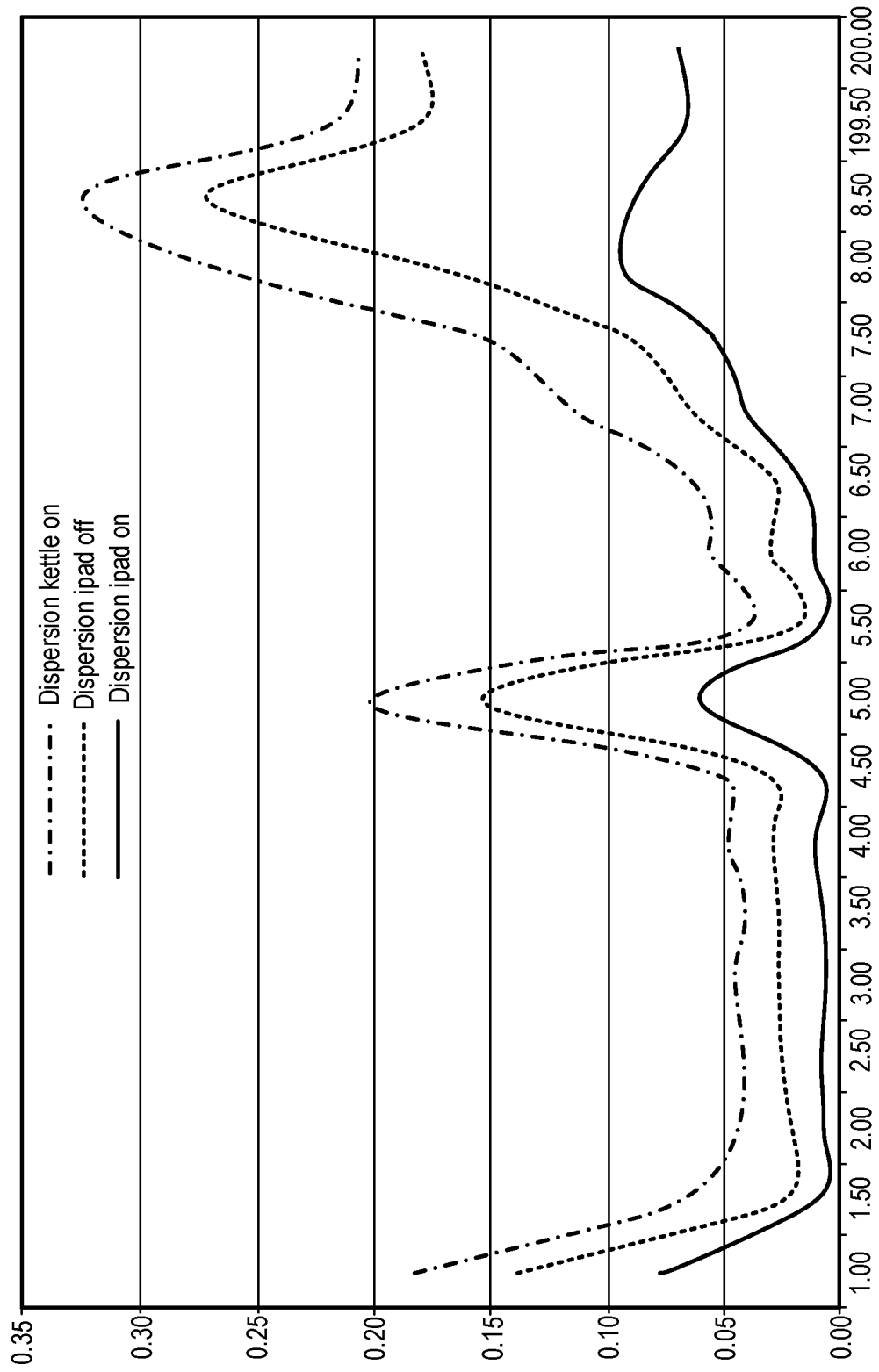
FIG. 11 is a diagram of an example of identifying different appliances using dispersion measurements.

FIG. 11 illustrates an example of identifying different appliances using dispersion measurements. The graph in FIG. 11 illustrates dispersion as a function of frequency. Dispersion measurements for two devices are shown in this example, a kettle and an e-tablet. The e-tablet's dispersion is shown for the e-tablet being turned on and off.

In this example, dispersion is measured using a simple (max minus min) dispersion metric. In other words, dispersion is measured as the maximum phase variation across a cycle minus the minimum phase variation across a cycle. As explained previously, dispersion changes with frequency and does so in different ways for different loads. As such, the graph in FIG. 11 shows three different plots of dispersion-versus-frequency for the two appliances. Each plot provides a "signature" of each appliance, in different operational statuses and locations.

As illustrated in FIG. 11, the upper-most plot corresponds to the dispersion of a kettle that is turned on. The two lower plots correspond to the e-tablet in an off status and an on status. Therefore, the difference between the upper-most dispersion plot and the two lower dispersion plots distinguishes a kettle from an e-tablet, and therefore enables identification of particular appliances connected to the electrical system. Further, the difference between the two lower plots distinguishes the e-tablet's "off" status from the same e-tablet's "on" status, and therefore enables monitoring the status of the e-tablet.

Although the example in FIG. 11 illustrates a complete characterization of dispersion as a continuous function of frequency, in practice such complete characterizations may not be possible or desirable. Instead, in some implementations, a finite set of sample points of frequencies may be probed, and the corresponding dispersion at those frequencies determined. For example, the probe waveform of FIG. 9 may be used to obtain 12 different frequency sample points, using the 12 bursts in each pulse train. As such, in some implementations, the "signature" of each device may not be a continuous graph as in FIG. 11, but may instead be a finite set of values of dispersion at different frequencies. If a sufficient number of frequency sample points are obtained, then a uniquely identifiable characterization of each device, and different statuses of each device, may be obtained. An example of this is illustrated next.

Figure 12:
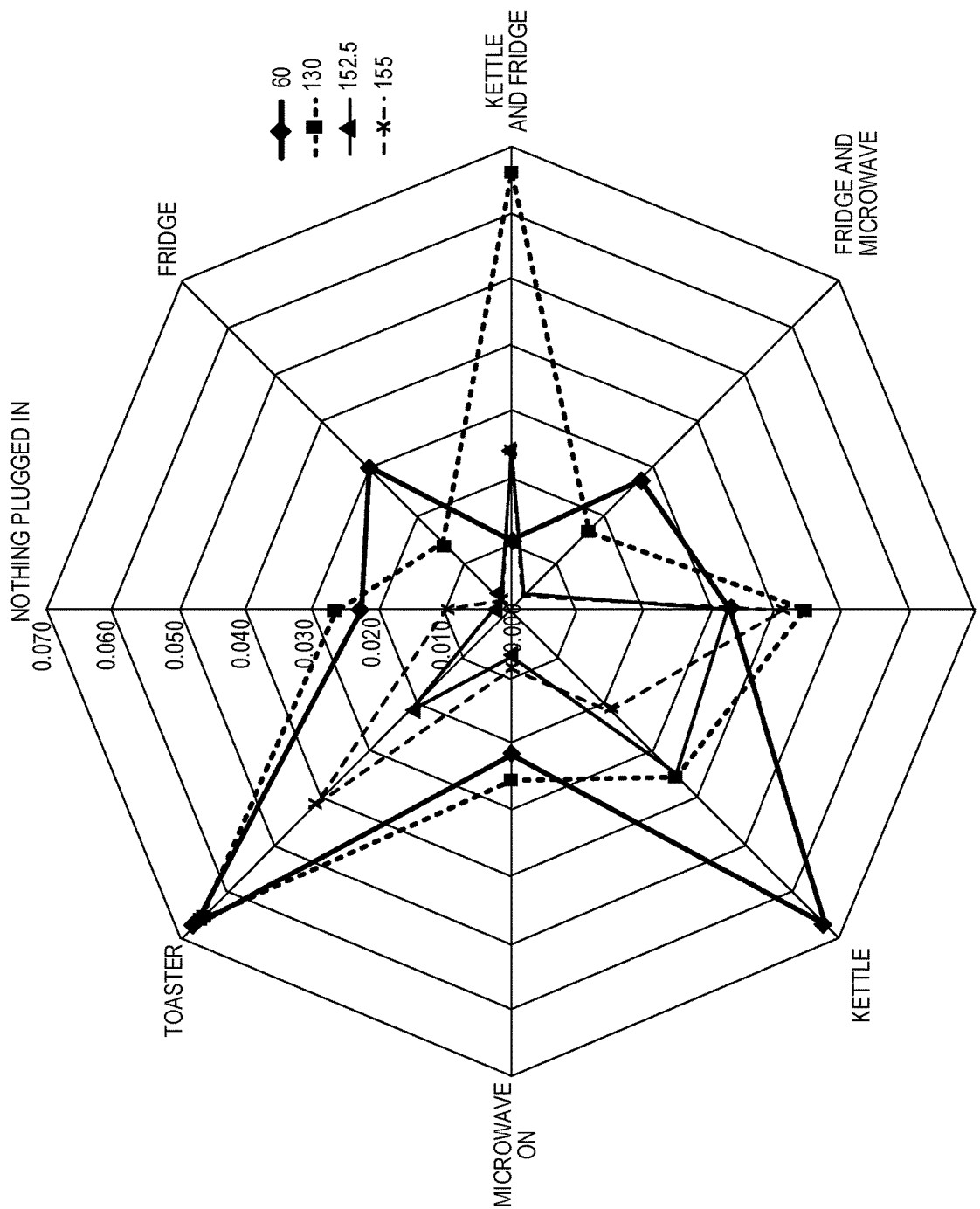
FIG. 12 is a diagram of an example of using a finite number of frequency samples to identify appliances connected to an electrical system.

FIG. 12 illustrates an example of dispersion variations across multiple devices, using a finite number of frequency samples. In this example, four different appliances are monitored: a toaster, a fridge, a microwave, and a kettle. In addition, four different frequency values are illustrated, 60 MHz, 130 MHz, 152.5 MHz, and 155 MHz. Each frequency is represented by one of the four star-shaped plots. The four star-shaped plots in FIG. 12 plot the values of dispersion in a radial direction, with the center corresponding to zero dispersion and values further from the center corresponding to larger values of dispersion.

Different angles around the radial plot correspond to a different status of devices. For example, the upper vertical axis corresponds to none of the appliances being plugged in. In this scenario, the dispersion at the frequency 130 MHz is largest, followed by the dispersion at frequency 60 MHz, the dispersion at frequency 155 MHz, and finally the smallest dispersion at frequency 152.5 MHz. Therefore, this particular correspondence between dispersion and frequency may be used as a "signature" to identify the case where none of the four appliances are turned on or connected to the electrical system.

Next, the upper-right axis corresponds to the status of only the fridge being turned on. In this scenario, the dispersion at frequency 60 MHz is largest, followed by the dispersion at frequency 130 MHz, and finally the dispersions at frequencies 152.5 MHz and 155 MHz are almost zero. Therefore, this particular correspondence between dispersion and frequency may be used as a "signature" to identify the case where only the fridge is turned on (e.g., a compressor of the fridge is turned on and running) among the four appliances.

Next, the right horizontal axis corresponds to the status of both the kettle and the fridge being turned on. In this scenario, the dispersion at frequency 130 MHz has a very large value, followed by the dispersions at frequencies 152.5 MHz and 155 MHz, which are nearly identical, and finally the dispersion at frequency 60 MHz. Therefore, this particular correspondence between dispersion and frequency may be used as a "signature" to identify the case where only the kettle and the fridge are turned on among the four appliances.

Next, the lower-right axis corresponds to the status of both the fridge and the microwave being turned on. In this scenario, the dispersion at frequency 60 MHz has the largest value, followed by the dispersion at frequency 130 MHz, and finally the dispersions at frequencies 152.5 MHz and 155 MHz. Therefore, this particular correspondence between dispersion and frequency may be used as a "signature" to identify the case where only the fridge and the microwave are turned on among the four appliances.

Similarly, the other four axes around the bottom and left sides of the graph in FIG. 12 illustrates different signatures for other combinations of appliances being turned on, such as both toaster and fridge being turned on, only the kettle being turned on, only the microwave on, and only the toaster on. Each scenario has a different set of values of dispersion for the four frequencies. Therefore, the set of four dispersion values for those four frequency sample points enables status identification of which devices are turned on. In general, more frequency sample points may be used, which may yield better discrimination between the different scenarios. For example, in FIG. 12, the scenario of only the fridge being on (upper-right axis) and both the fridge and microwave being on (lower-right axis) have relatively similar signatures based on the four frequencies selected. To enable better discrimination between those two scenarios, more than four frequencies may be used, so that the additional frequencies show more divergence between scenarios.

Figure 13:
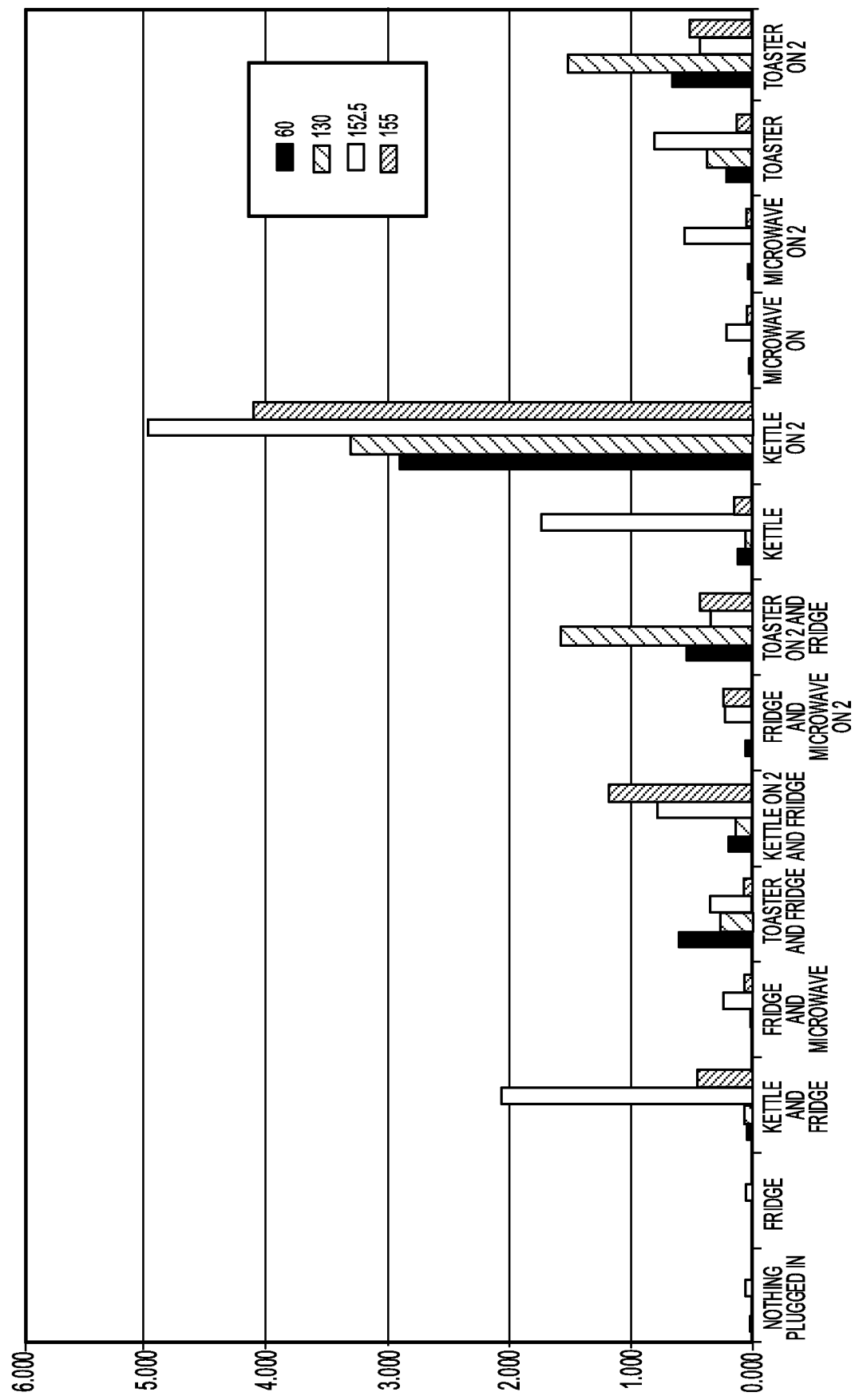
FIG. 13 is a diagram of an example of location determination for different configurations using a finite number of frequencies.

FIG. 13 illustrates an example of location determination for different configurations using a finite number of frequencies. This example again illustrates four different frequencies, 60 MHz, 130 MHz, 152.5 MHz, and 155 MHz, this time using bar graphs to represent the values of dispersion for the four different frequencies in different scenarios. As seen in this example, not only does the signature of dispersion-versus-frequency depend on which appliances are turned on, but also on the location of the appliances.

For example, the "toaster" plots on the far right-side of FIG. 13 may be compared to the "toaster on 2" plots that are adjacent to the right. The differences between the dispersion values at different frequencies in these two groups of plots enable determining at which a range of locations the toaster is located. Similarly, differences between the "microwave" and "microwave on 2" plots, to the left of the toaster plots, enable discerning between two locations of the microwave, and differences between the "kettle" and "kettle on 2" plots, further to the left, enable discerning between two locations of the kettle.

In some implementations, the rate of change of dispersion may be analyzed to determine the locations of devices. For example, the rate-of-change of the dispersion as the frequency increases from 60 MHz, 130 MHz, 152.5 MHz, to 155 MHz may be analyzed in addition to the magnitudes of the dispersion values themselves. By using such differential information, in addition to the dispersion values themselves, the system may be able to more accurately and reliably determine location information.

In addition, location determination may be combined with status determination, as illustrated by the plots to the left of the "kettle" and "kettle on 2" plots. For example, the "toaster on 2 and fridge" plot may be distinguished from the "toaster" plot to determine whether the toaster is at a first or second location and also to determine whether the fridge compressor is running or not.

As in previous examples, additional frequency sample points beyond the four illustrated in FIG. 13 may enable more accurate and more comprehensive determination of the location and/or status of the different appliances. In such cases, for example, higher-order derivative information, such as second-order derivatives, may be utilized to further glean information regarding the devices.

Figure 14:
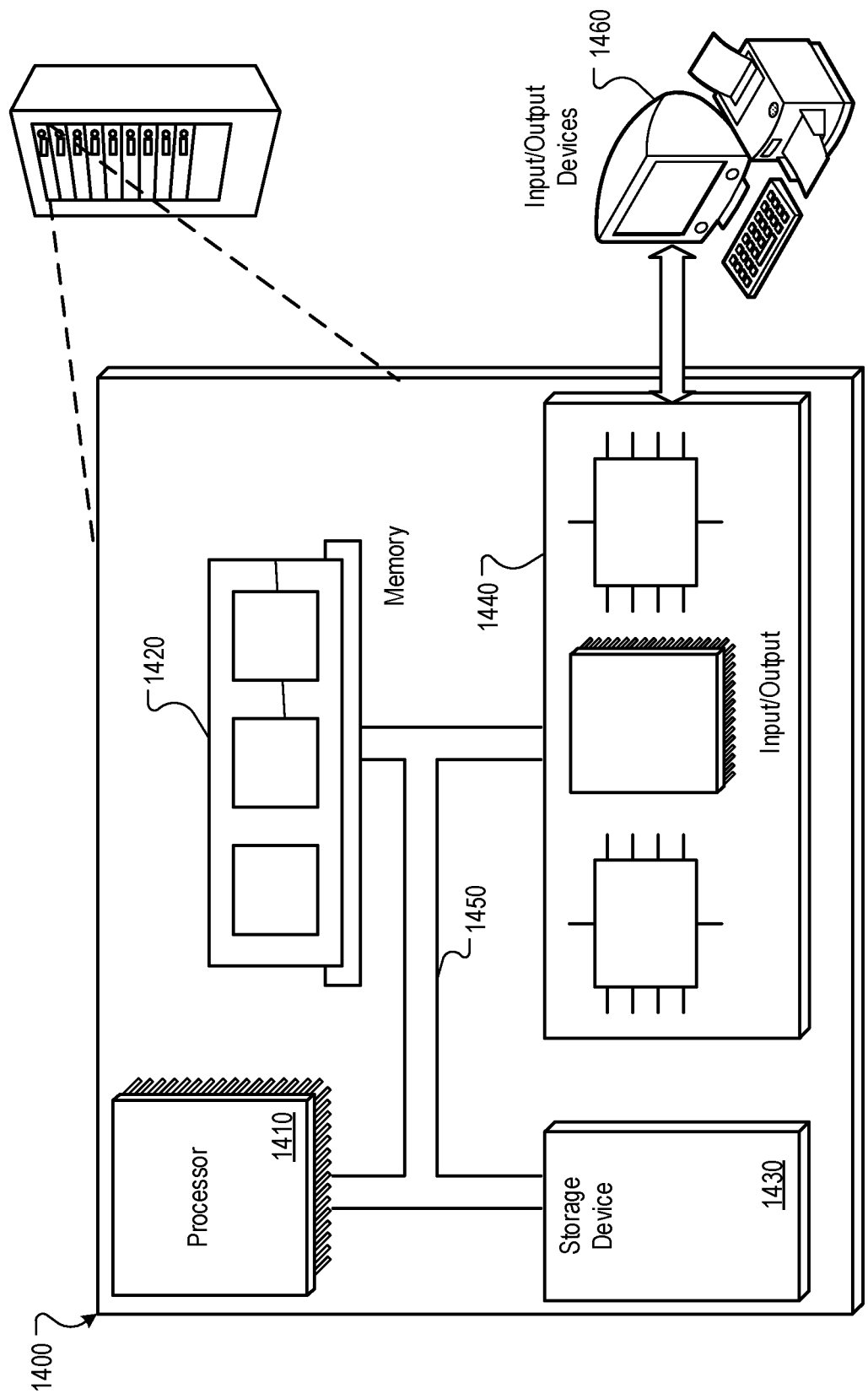
FIG. 14 is a diagram of an example of a computing system that may be used to implement one or more components of a probing system.

FIG. 14 is a block diagram of an example computer system 1400. For example, one or more parts of a probe system could be an example of the system 1400 described here, such as a computer system implemented in any of the probes, devices used by any of the users who access information from the probes, or a server that accesses or stores information regarding the probes. The system 1400 includes a processor 1410, a memory 1420, a storage device 1430, and an input/output device 1440. Each of the components 1410, 1420, 1430, and 1440 can be interconnected, for example, using a system bus 1450. The processor 1410 is capable of processing instructions for execution within the system 1400. In some implementations, the processor 1410 is a single-threaded processor. In some implementations, the processor 1410 is a multi-threaded processor. In some implementations, the processor 1410 is a quantum computer. The processor 1410 is capable of processing instructions stored in the memory 1420 or on the storage device 1430. The processor 1410 may execute operations such as those described in regards to the probes.

The memory 1420 stores information within the system 1400. In some implementations, the memory 1420 is a computer-readable medium. In some implementations, the memory 1420 is a volatile memory unit. In some implementations, the memory 1420 is a non-volatile memory unit.

The storage device 1430 is capable of providing mass storage for the system 1400. In some implementations, the storage device 1430 is a computer-readable medium. In various different implementations, the storage device 1430 can include, for example, a hard disk device, an optical disk device, a solid-date drive, a flash drive, magnetic tape, or some other large capacity storage device. In some implementations, the storage device 1430 may be a cloud storage device, e.g., a logical storage device including multiple physical storage devices distributed on a network and accessed using a network. In some examples, the storage device may store long-term data, such as known signatures of devices or other pre-stored information related to probing. The input/output device 1440 provides input/output operations for the system 1400. In some implementations, the input/output device 1440 can include one or more of a network interface devices, e.g., an Ethernet card, a serial communication device, e.g., an RS-232 port, and/or a wireless interface device, e.g., an 802.11 card, a 3G wireless modem, a 4G wireless modem. A network interface device allows the system 1400 to communicate, for example, information regarding probing of devices. In some implementations, the input/output device can include driver devices configured to receive input data and send output data to other input/output devices, e.g., keyboard, printer and display devices 1460. In some implementations, mobile computing devices, mobile communication devices, and other devices can be used.

A server can be realized by instructions that upon execution cause one or more processing devices to carry out the processes and functions described above. Such instructions can comprise, for example, interpreted instructions such as script instructions, or executable code, or other instructions stored in a computer readable medium. The system can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

Although an example processing system has been described in FIG. 14, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Figure 15:
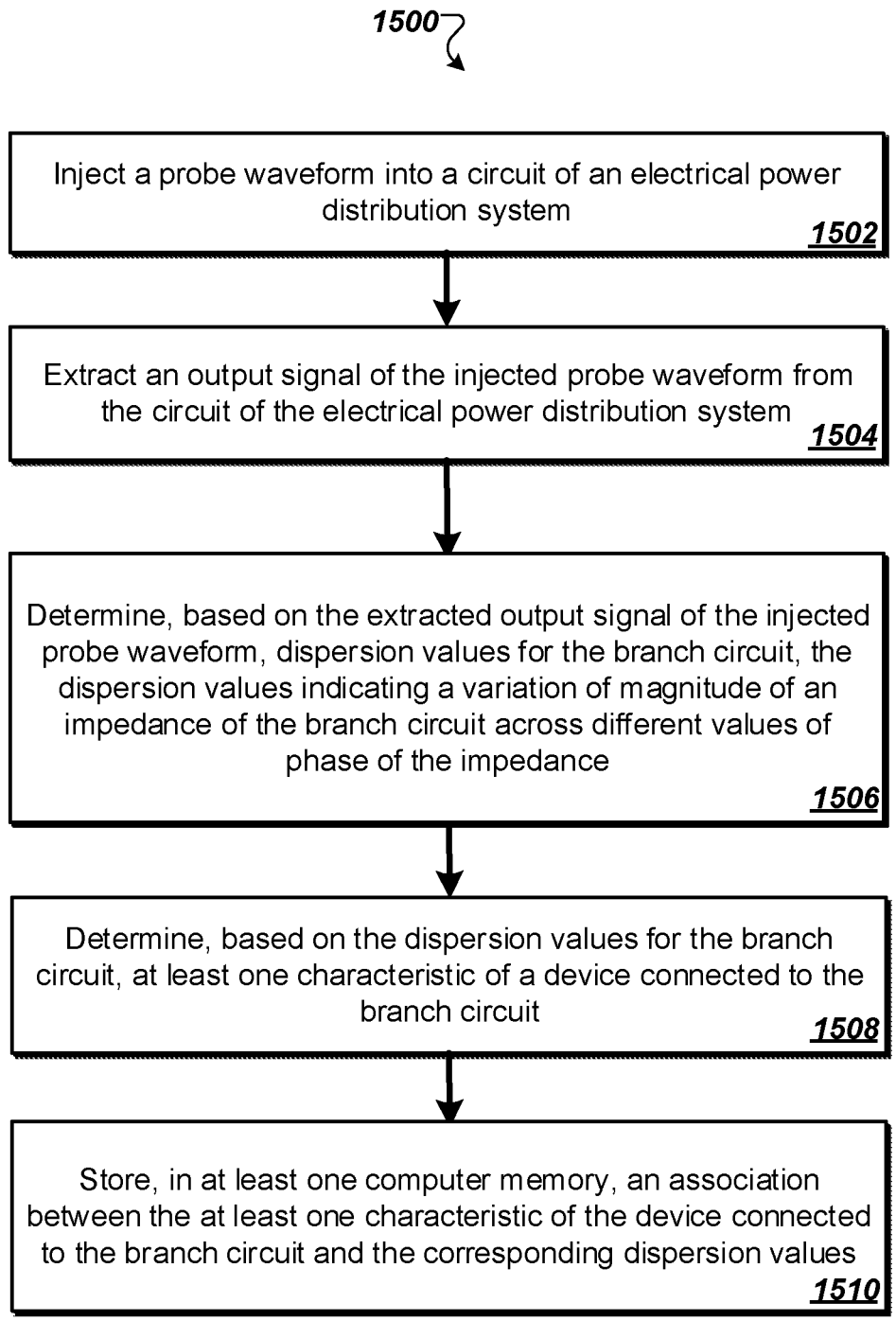
FIGS. 15 and 16 are flowcharts illustrating examples of performing dispersion analysis to identify and monitor appliances connected to an electrical power distribution system.

FIG. 15 is a flowchart of an example of monitoring electrical appliances operating on an electrical system.

In the example process of FIG. 15, a probe waveform is injected into a circuit of an electrical power distribution system (1502). The probe waveform may, for example, have characteristics such as those described in relation to FIGS. 9 and 10, above. An output signal of the injected probe waveform is extracted from the circuit of the electrical power distribution system (1504). The output signal may be extracted by the same probe device that injected the probe waveform, or by another probe device.

Based on the extracted output signal of the injected probe waveform, dispersion values are determined for the branch circuit (1506). The dispersion values indicate a variation of magnitude of an impedance of the branch circuit across different values of phase of the impedance, as described above.

Based on the dispersion values for the branch circuit, at least one characteristic of a device connected to the branch circuit is determined (1508). Such characteristics may include, for example as described above, an operation status of a device, a range of locations or co-locations of the device relative to other devices, etc.

An association between the at least one characteristic of the device connected to the branch circuit and the corresponding dispersion values is stored in at least one computer memory (1510). As such, the dispersion value may be used as a "signature" by which to identify a device and its operational status or relative location on the electrical network.

In some implementations, injecting a probe waveform into a circuit of an electrical power distribution system may include injecting two different probe waveforms: a first probe waveform at a first time delay after a first zero-crossing of a power line voltage signal of the circuit, and injecting a second probe waveform at a second time delay after a second zero-crossing of the power line voltage signal of the circuit. Both the first probe waveform and the second probe waveform may then be extracted from the circuit and analyzed to determine dispersion values.

Figure 16:
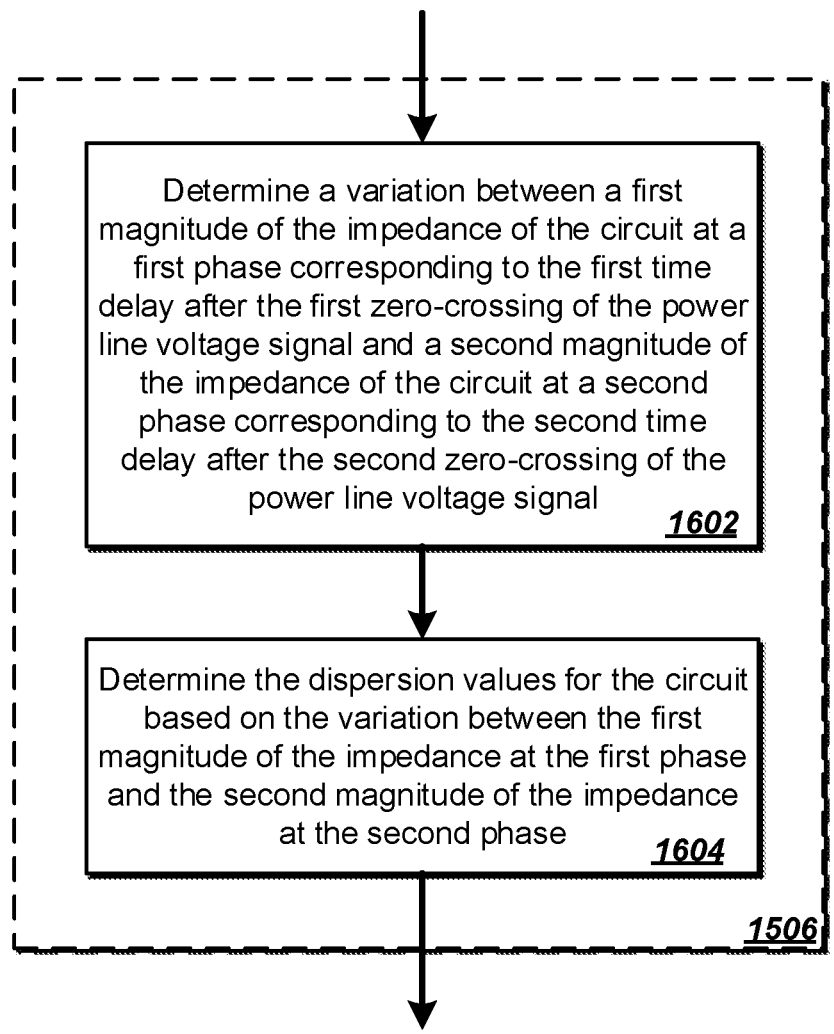

FIG. 16 is a flowchart showing further details of monitoring the operation of appliances receiving power from an electrical system. In particular, the example of FIG. 16 shows details of determining dispersion values based on an extracted output signal of an injected probe waveform (e.g., operation 1506 in FIG. 15).

In the example of FIG. 16, a variation is determined between a first magnitude of impedance of the circuit at a first phase corresponding to a first time delay after a first zero-crossing of the power line voltage signal and a second magnitude of impedance of the circuit at a second phase corresponding to a second time delay after a second zero-crossing of the power line voltage signal (1602).

The dispersion values for the circuit may then be determined based on the variation between the first magnitude of the impedance at the first phase and the second magnitude of the impedance at the second phase (1604).

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A computer-implemented method comprising:
   injecting probe waveforms by injecting, with a first probe electrically coupled to a circuit of an electrical power distribution system and for each of multiple frequencies, a probe waveform at a particular frequency of the multiple frequencies into the circuit of the electrical power distribution system;
   extracting output signals by extracting, with a second probe electrically coupled to a circuit of an electrical power distribution system and for each of the probe waveforms injected for each of the multiple frequencies, an output signal from the circuit of the electrical power distribution system;
   determining, based on the extracted output signals of the injected probe waveforms, dispersion values for the circuit, the dispersion values each indicating a differ-

37 ence of magnitude of an impedance of the circuit between two different values of phase of the impedance for a particular frequency of the multiple frequencies of the probe waveforms;

determining, based on the dispersion values for the circuit, at least one characteristic of a device connected to the circuit; and providing a notification of the at least one characteristic of the device that is determined to a user.

2. The method of claim 1, wherein the circuit comprises at least one of a branch circuit, a feeder circuit, a shared-neutral circuit, or a multiwire circuit.

3. The method of claim 1, wherein determining, based on the dispersion values for the circuit, at least one characteristic of a device connected to the circuit comprises:

determining at least one of an identity of a device connected to the circuit, an operational status of a device connected to the circuit, a range of physical locations of a device connected to the circuit, or a co-location of a device connected to the circuit.

4. The method of claim 3, wherein determining an identity of a device connected to the circuit comprises:

accessing, from the at least one computer memory, stored first dispersion values that are associated with a first device;

accessing, from the at least one computer memory, stored second dispersion values that are associated with a second device;

comparing the dispersion values for the circuit with the stored first dispersion values and the stored second dispersion values; and determining, based on comparing the dispersion values for the circuit with the stored first dispersion values and the stored second dispersion values, whether the first device or the second device is connected to the circuit.

5. The method of claim 3, wherein determining an operational status of a device connected to the circuit comprises:

accessing, from the at least one computer memory, stored first dispersion values that are associated with a first operation status of the device;

accessing, from the at least one computer memory, stored second dispersion values that are associated with a second operational status of the device;

comparing the dispersion values for the circuit with the stored first dispersion values and the stored second dispersion values; and determining, based on comparing the dispersion values for the circuit with the stored first dispersion values and the stored second dispersion values, whether the device is in the first operational status or the second operational status.

6. The method of claim 3, wherein determining a range of physical locations of a device connected to the circuit comprises:

accessing, from the at least one computer memory, stored first dispersion values that are associated with a first range of locations of the device;

accessing, from the at least one computer memory, stored second dispersion values that are associated with a second range of locations of the device;

comparing the dispersion values for the circuit with the stored first dispersion values and the stored second dispersion values; and determining, based on comparing the dispersion values for the circuit with the stored first dispersion values and

38 the stored second dispersion values, whether the device is at the first range of locations or the second range of locations.

7. The method of claim 6, wherein comparing the dispersion values for the circuit with the stored first dispersion values and the stored second dispersion values comprises:

comparing a rate of change of dispersion values as a function of frequency for the circuit with a first rate of change of stored first dispersion values as a function of frequency and a second rate of change of stored second dispersion values as a function of frequency.

8. The method of claim 1, wherein:

injecting a probe waveform into a circuit of an electrical power distribution system comprises injecting a first probe waveform at a first time delay after a first zero-crossing of a power line voltage signal of the circuit, and injecting a second probe waveform at a second time delay after a second zero-crossing of the power line voltage signal of the circuit; and extracting an output signal of the injected probe waveform from the circuit of the electrical power distribution system comprises extracting the first probe waveform from the circuit, and extracting the second probe waveform from the circuit.

9. The method of claim 8, wherein determining, based on the extracted output signal of the injected probe waveform, dispersion values for the circuit comprises:

determining a difference between a first magnitude of the impedance of the circuit at a first phase corresponding to the first time delay after the first zero-crossing of the power line voltage signal and a second magnitude of the impedance of the circuit at a second phase corresponding to the second time delay after the second zero-crossing of the power line voltage signal; and determining the dispersion values for the circuit based on the difference between the first magnitude of the impedance at the first phase and the second magnitude of the impedance at the second phase.

10. The method of claim 1, further comprising:

accessing, from the at least one computer memory, baseline dispersion values, and subtracting, from the dispersion values of the circuit, the baseline dispersion values.

11. The method of claim 1, wherein the circuit is one of a first branch circuit or a second branch circuit, the first branch circuit operating at a first phase of the electrical power distribution system, and the second branch circuit operating at a second phase of the electrical power distribution system, and the method further comprises:

injecting a first probe waveform into the first branch circuit;

injecting a second probe waveform into the second branch circuit;

extracting a first output signal of the injected first probe waveform from the first branch circuit of the electrical power distribution system; and extracting a second output signal of the injected second probe waveform from the second branch circuit of the electrical power distribution system.

12. At least one non-transitory computer-readable storage medium encoded with executable instructions that, when executed by at least one processor, cause the at least one processor to perform operations comprising:

injecting probe waveforms by injecting, with a first probe electrically coupled to a circuit of an electrical power distribution system and for each of multiple frequencies, a probe waveform at a particular frequency of the multiple frequencies into the circuit of the electrical power distribution system;

extracting output signals by extracting, with a second probe electrically coupled to a circuit of an electrical power distribution system and for each of the probe waveforms injected for each of the multiple frequencies, an output signal from the circuit of the electrical power distribution system;

determining, based on the extracted output signals of the injected probe waveforms, dispersion values for the circuit, the dispersion values each indicating a difference of magnitude of an impedance of the circuit between two different values of phase of the impedance for a particular frequency of the multiple frequencies of the probe waveforms;

determining, based on the dispersion values for the circuit, at least one characteristic of a device connected to the circuit; and providing a notification of the at least one characteristic of the device that is determined to a user.

13. The at least one computer-readable medium of claim 12, wherein the circuit comprises at least one of a branch circuit, a feeder circuit, a shared-neutral circuit, or a multi-wire circuit.

14. The at least one computer-readable medium of claim 12, wherein determining, based on the dispersion values for the circuit, at least one characteristic of a device connected to the circuit comprises:

determining at least one of an identity of a device connected to the circuit, an operational status of a device connected to the circuit, a range of physical locations of a device connected to the circuit, or a co-location of a device connected to the circuit.

15. The at least one computer-readable medium of claim 14, wherein determining an identity of a device connected to the circuit comprises:

accessing, from the at least one computer memory, stored first dispersion values that are associated with a first device;

accessing, from the at least one computer memory, stored second dispersion values that are associated with a second device;

comparing the dispersion values for the circuit with the stored first dispersion values and the stored second dispersion values; and determining, based on comparing the dispersion values for the circuit with the stored first dispersion values and the stored second dispersion values, whether the first device or the second device is connected to the circuit.

16. The at least one computer-readable medium of claim 14, wherein determining an operational status of a device connected to the circuit comprises:

accessing, from the at least one computer memory, stored first dispersion values that are associated with a first operation status of the device;

accessing, from the at least one computer memory, stored second dispersion values that are associated with a second operational status of the device;

comparing the dispersion values for the circuit with the stored first dispersion values and the stored second dispersion values; and determining, based on comparing the dispersion values for the circuit with the stored first dispersion values and the stored second dispersion values, whether the device is in the first operational status or the second operational status.

17. The at least one computer-readable medium of claim 14, wherein determining a range of physical locations of a device connected to the circuit comprises:

accessing, from the at least one computer memory, stored first dispersion values that are associated with a first range of locations of the device;

accessing, from the at least one computer memory, stored second dispersion values that are associated with a second range of locations of the device;

comparing the dispersion values for the circuit with the stored first dispersion values and the stored second dispersion values; and determining, based on comparing the dispersion values for the circuit with the stored first dispersion values and the stored second dispersion values, whether the device is at the first range of locations or the second range of locations.

18. The at least one computer-readable medium of claim 17, wherein comparing the dispersion values for the circuit with the stored first dispersion values and the stored second dispersion values comprises:

comparing a rate of change of dispersion values as a function of frequency for the circuit with a first rate of change of stored first dispersion values as a function of frequency and a second rate of change of stored second dispersion values as a function of frequency.

19. The at least one computer-readable medium of claim 12, wherein:

injecting a probe waveform into a circuit of an electrical power distribution system comprises injecting a first probe waveform at a first time delay after a first zero-crossing of a power line voltage signal of the circuit, and injecting a second probe waveform at a second time delay after a second zero-crossing of the power line voltage signal of the circuit; and extracting an output signal of the injected probe waveform from the circuit of the electrical power distribution system comprises extracting the first probe waveform from the circuit, and extracting the second probe waveform from the circuit.

20. A system comprising:

at least one processor; and at least one computer memory coupled to the at least one processor having stored thereon instructions which, when executed by the at least one processor, cause the at least one processor to perform operations comprising:

injecting probe waveforms by injecting, with a first probe electrically coupled to a circuit of an electrical power distribution system and for each of multiple frequencies, a probe waveform at a particular frequency of the multiple frequencies into the circuit of the electrical power distribution system;

extracting output signals by extracting, with a second probe electrically coupled to a circuit of an electrical power distribution system and for each of the probe waveforms injected for each of the multiple frequencies, an output signal from the circuit of the electrical power distribution system;

determining, based on the extracted output signals of the injected probe waveforms, dispersion values for the circuit, the dispersion values each indicating a difference of magnitude of an impedance of the circuit between two different values of phase of the impedance for a particular frequency of the multiple frequencies of the probe waveforms;

determining, based on the dispersion values for the circuit, at least one characteristic of a device connected to the circuit; and
providing a notification of the at least one characteristic of the device that is determined to a user.

\* \* \* \* \*